United States Patent [19]

Juvan

[11] Patent Number: 4,957,606
[45] Date of Patent: Sep. 18, 1990

[54] SEPARATION OF DISSOLVED AND UNDISSOLVED SUBSTANCES FROM LIQUIDS USING HIGH ENERGY DISCHARGE INITIATED SHOCK WAVES

[76] Inventor: Christian H. A. Juvan, 10053 Judy Ave., Cupertino, Calif. 95014

[21] Appl. No.: 239,184

[22] Filed: Aug. 31, 1988

Related U.S. Application Data

[63] Continuation-in-part of Ser. No. 78,655, Jul. 28, 1987, Pat. No. 4,917,785.

[51] Int. Cl.$^5$ .......................... B01J 3/08; B01J 19/08
[52] U.S. Cl. .................................. 204/164; 204/165; 204/168; 204/172; 204/157.15; 204/158.2; 204/158.21; 210/243; 210/748; 422/186.28
[58] Field of Search .............. 204/164, 165, 168, 172, 204/157.15, 158.2, 158.21, 902, 903, 907, 912; 422/186.28; 210/748, 243; 585/648, 953

[56] References Cited

U.S. PATENT DOCUMENTS

| | | | |
|---|---|---|---|
| 2,958,716 | 11/1960 | Lahr et al. | 585/953 |
| 3,220,873 | 11/1965 | Wesley | 204/164 |
| 3,240,689 | 3/1966 | Lauer | 585/953 |
| 3,408,432 | 10/1968 | Tumm et al. | 118/620 |
| 3,491,010 | 1/1970 | Ishibashi | 204/170 |
| 4,077,888 | 3/1978 | Rhoades et al. | 204/165 |
| 4,367,130 | 1/1983 | Lemelson | 204/157.62 |

Primary Examiner—John F. Niebling
Assistant Examiner—David G. Ryser
Attorney, Agent, or Firm—Thomas M. Freiburger

[57] ABSTRACT

A method and apparatus are disclosed for efficient processing of liquids and the precipitation of dissolved elements and chemical compounds. Improvements over prior systems include system layout, components and modes of operation of the system. Applications of the system include destruction of toxic wastes and sewage treatment, precipitation of chemical compounds and elements including metals from solution (brine, sea water, industrial waste), sterilization and water purification, catalytic formation of chemical compounds, and processing of hydrocarbons.

24 Claims, 14 Drawing Sheets

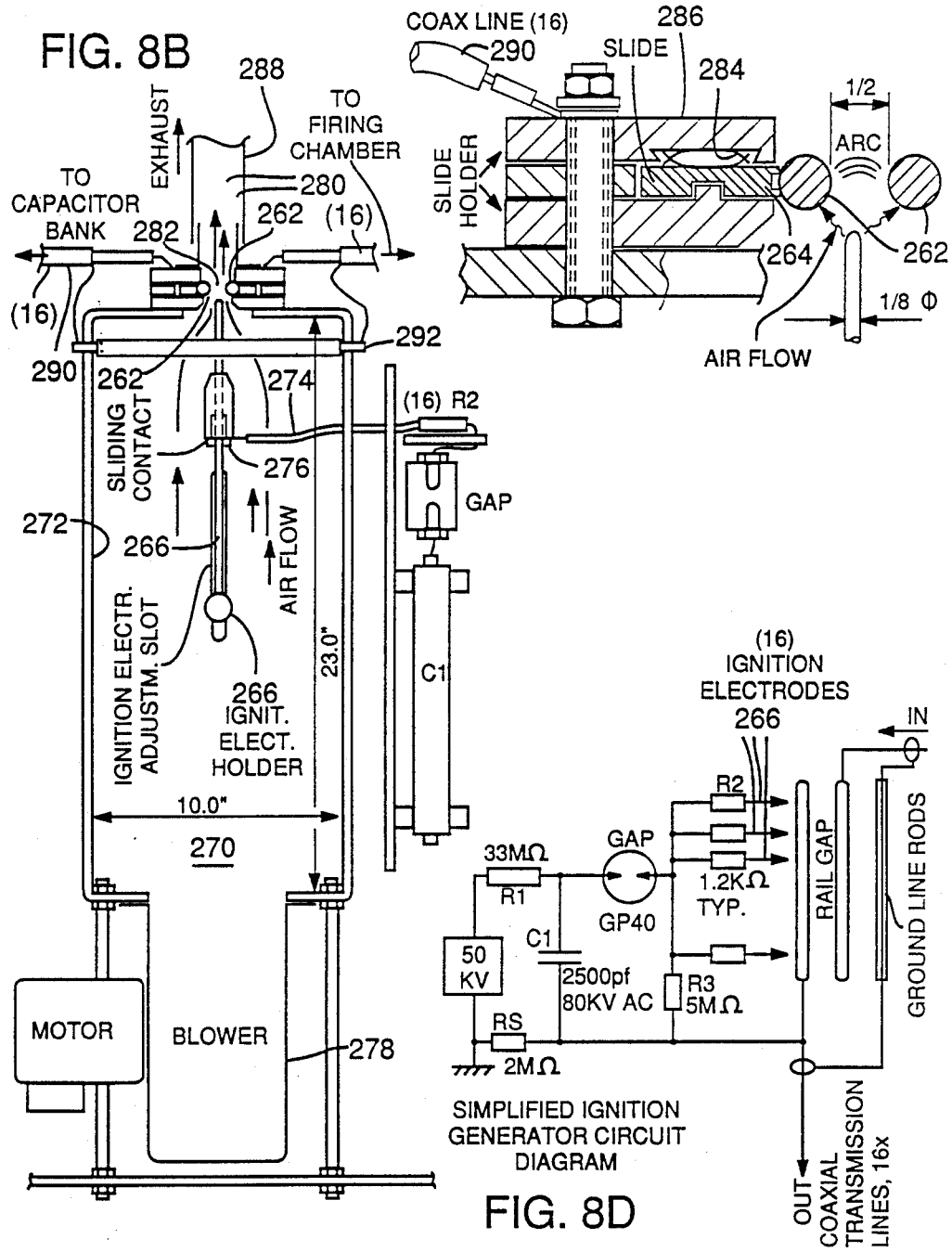

SEPARATION OF DISSOLVED AND UNDISSOLVED SUBSTANCES FROM LIQUIDS USING HIGH ENERGY DISCHARGE INITIATED SHOCK WAVES

REFERENCE TO RELATED APPLICATION

This application is a continuation-in-part of application Ser. No. 78,655, filed July 28, 1987, now U.S. Pat. No. 4,917,785.

BACKGROUND OF THE INVENTION

The invention relates to liquid processing systems, and in particular to a process and system for processing of liquids and the precipitation of the dissolved substances from the liquid, or reactive burning of substances to remove them, utilizing high-energy discharge in the liquid.

High-energy electrical discharge into a closed liquid volume for the purpose of changing chemical constituents or removing certain elements or compounds from solution has been known, sometimes under the name electro-hydraulics. U.S. Pat. No. 3,220,873 of R. H. Wesley, titled "Coating and Impregnation of Articles by Spark Generated Shock Waves", discusses the removal of constituents from liquids containing chemical compounds. Areas of application disclosed in the patent include plating of an electrode with metal, impregnation of surfaces with desired substances, and the removal of constituents from solutions as precipitates, such as for the recovering of metals from solution.

The following additional patents also have some relationship to the subject of electro-hydraulics: U.S. Pat. Nos. 3,222,902, 3,232,085, 3,267,710, 3,408,843, 3,456,291, 3,491,010, 4,077,888. These patents are not as pertinent to the subject matter of this invention as is the Wesley patent, most of them dealing with metal forming by electrical discharge.

Previous to the present invention, the use of high-energy electrical discharge into a volume of liquid had not been an efficient and practical tool for recovery of metals and other substances from liquids or slurries, for treatment of waste water, particularly with industrial wastes, for purification of water or other purposes. Previously nearly all work done with electro-hydraulics was experimental, not practical for industrial processes for several reasons. One reason was that in the repeated discharging of a high-energy electrical arc across a gap between electrodes, the electrodes are rather rapidly eroded and burned up. Similarly, switching components are consumed by burnup. There has not been suggested any practical approach for addressing this problem, and such a substantial down time would have been required with previous systems, for replacing electrodes, insulators and switch elements consumed in the process, that the process was not made economically feasible.

Another problem with the systems suggested in prior patents was that the effects of the sharp shock wave that is sent through the liquid, on the firing chamber and auxiliary systems, was not taken into consideration.

Further problems with prior suggested systems were high self-inductance of electrical circuits and assemblies to the extent that efficiency would be severely reduced, high component cost, particularly replacement components, to the extent of diminishing feasibility, inefficient conduction of power to the electrodes in the firing chamber, and in general a failure to take advantage of the industrial potential of the process.

It is among the objects of the present invention to address these and other short comings of the prior systems, as well as to include further advantageous features which increase the efficiency of this process by a very large factor and make it applicable efficiently to a number of industrial processing applications and including new fields not previously contemplated.

SUMMARY OF THE INVENTION

In a system according to the present invention, liquid processing using a high-energy electrical discharge through a contained volume is performed at very high efficiency, with relatively low component cost, very low down time, relatively low power consumption and low plant cost for a relatively high volume throughput.

In preferred embodiments of the system high-energy discharges are pulsed through successive liquid volumes at a rate of at least once per six seconds, and preferably faster, such as once per second or more frequently.

The firing chamber of the system of the invention is specially configured to attenuate shock waves, and in addition, hydraulic shock absorbers are positioned upstream and downstream of the firing chamber, without rigid flow barriers such as valves.

An important feature of the invention is the construction of the firing chamber assembly, whereby the firing chamber is held together by hydraulic pressure exerted by a piston acting against spring pressure tending to open the assembly. By this construction, the stacked components can be readily disassembled by release of the hydraulic pressure, for quick removal of electrodes, insulators and other consumable components which are subject to eroding and burnup in the process. Additionally, the electrodes and insulators may include a burnup volume, which can be burned away while still allowing the process to function efficiently. In this way, a large sacrificial volume is included on consumable components to increase the service time of the components before they must be replaced.

Another aspect of the invention is electrode feed and insulator sleeve feed, whereby these consumable components are continually fed into the firing chamber during the process, so that the consumed volumes of these components are continually replaced and disassembly is not necessary, eliminating down time. The insulator may actually be extruded by an extruding device, during operation of the system. Alternatively, a special composite may be used in a long-life insulator.

In one embodiment of the invention, a special high efficiency electrode and firing chamber design produces a phenomenon known as plasma compression or theta pinch, for compressing the discharge arc and producing an electromagnetic discharge of shorter wavelengths, which produces better efficiency and more effective breakdown and removal of certain substances from solution.

In some embodiments of the invention, hollow electrodes in opposed configuration in the firing chamber constantly induct a fluid into the firing chamber (to mix with the processed liquid), which cools the electrodes and prolongs their life.

Also in accordance with embodiments of the invention, highly efficient arrangements are included for power conduction to the electrodes and for switching power to the electrodes. If a blown rail gap switch is used, it can include an electrode contact slide. A special switch in accordance with one embodiment of the invention is coaxial, with the electrodes constantly immersed in a gas bath which greatly reduces electrode burnup. The switch assembly has a very low self-inductance, includes some burnup volume for prolonging life, has a cooling means for cooling the switch components, and a special triggering device comprising an ignition electrode with an RF trigger. It can also include an arc blowout feature for self-interruption of the discharge current.

In further aspects of the invention, an assembly of multiple electro-hydraulic units are efficiently banked together in a plant.

Other objects, advantages and features of the invention will be apparent from the following description of a preferred embodiment, considered along with the accompanying drawings.

DESCRIPTION OF THE DRAWINGS

FIG. 5 also illustrates the arrangement of components of the firing chamber structure which enable the consumable components to be readily replaced in a minimum of time.

FIG. 6 also illustrates a firing chamber configuration for attenuating shock waves from the plasma discharge.

In FIG. 7 the electrodes are hollow and coolant flows through them for cooling the electrodes and surrounding components, and a special arrangement is shown for conducting power to the electrodes.

FIG. 8B is an elevational cross section of the blown rail gap switch of FIG. 8 and associated components.

FIG. 8C is a detailed view showing the electrodes and a contact slide arrangement associated with the blown rail gap assembly shown in FIGS. 8A and 8B.

FIG. 8D is a simplified schematic showing an ignition generator associated with the blown rail gap of the preceding views.

DESCRIPTION OF PREFERRED EMBODIMENTS

I. Principle Involved (FIG. 1)

Figure 1:
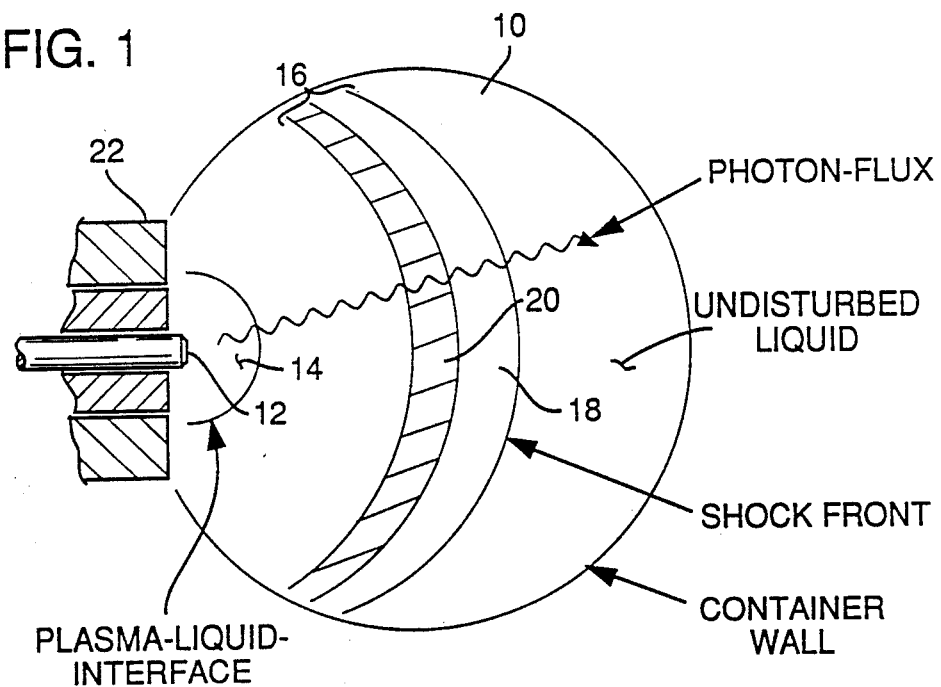
FIG. 1 is a schematic cross sectional view illustrating the physical principles of the electro-hydraulic process.

In the drawings, FIG. 1 illustrates the general principle involved in the system of the invention. The principle is sometimes known as electro-hydraulic.

The electro-hydraulic effect is described in terms of following events in time, starting with the discharge of stored energy into a liquid volume 10 and the space around a center electrode 12 (in the case of a coaxial electrode arrangement as illustrated).

At the moment of the closure of a discharge switch (not shown), the current at the surface of the center electrode 12 begins to heat up the liquid. When the boiling point of the liquid is reached, a blanket of steam starts forming on the electrode surface. Until that time, no pressure increase is generated in the liquid and the energy used so far is lost as far as the desired effects are concerned.

As the steam blanket expands out from the electrode 12, the electrode surface is increasingly insulated from the conducting liquid. This effect is accelerated by the fact that the current is driven (although continuously increasing at this point in time) in a "current driving mode." Therefore, the electrical conduction shifts from the insulated parts of the electrode to areas that are still in contact with the liquid, heating these regions even faster.

When the entire electrode tip is covered by steam, the steam blanket breaks through electrically and the electrical discharge generates a plasma region 14 that becomes heated up very fast by the ionic current. Since the current flows from the electrode against the plasma-liquid interface, more liquid is ionized at that interface due to the ion bombardment and the pressure in that region rises quickly.

The electrical resistance of the plasma is much higher than that of the liquid, and therefore most of the supplied energy is deposited there. At this point the plasma region is a source of intense light, much of it in the UV region, that irradiates the liquid volume 10 according to the specific radiation-absorption condition of the liquid, the chemical compounds dissolved in it, etc.

The power levels desired are quite high, and can be approximately two gigawatts per liter, and for all practical purposes it can be said that the matter in the entire volume 10 is temporarily ionized at some time or another during the discharge.

As the plasma region 14 expands, it generates a shock wave 16 that propagates through the volume and compresses the liquid in the zone 18 behind it. Depending on the discharge circuit, its timing elements (circuit inductance, storage capacitance, etc.) and the conductive properties of liquid and plasma, part or all of the firing chamber volume is irradiated while the compression takes place; and that process might continue during the propagation of the rarefaction zone 20 following the compression wave.

Since the turbulence in the shocked material is very high, and since the photon flux keeps the material ionized, it is believed that the electrical bonds between the molecules and atoms are canceled, with all chemicals going into the free-ion state.

After the radiation ceases to exist and the plasma cools off, recombination occurs according to chemical reactions possible by the elements present; however, it is observed that nonreactive elements precipitate out not in molecular form but in micron-sized particles. That is thought to be the case because of the turbulence going on while some elements are still partially ionized and therefore electrically positive-charged, while others are temporarily negative-charged by the free electrons present and therefore electrically mutually attracted.

Particles as large as 100 microns have been observed, and the lower limit observed is limited by the resolution of analytical instruments (microscope, particle spectrometer). The forming of the relatively large solids particles is important for the commercial aspect of this method, since these particles can easily be filtered from the liquid by mechanical means. Finemesh filters work well, but centrifugal filtering is industrially more convenient.

After the shock waves hit the container wall (not shown), some of its energy is reflected and some propagates through the material of the process vessel (not shown in FIG. 1). The vessel has to be constructed to withstand the pressure generated; depending on discharge energy and timing it is on the order of a few hundred thousand psi.

Fortunately, the wall material (e.g. steel) has a tendency to work harden and even some permanent volume compression of the firing chamber's steel wall has been observed, probably due to the elimination of microscopic voids in the material. Also, a self-compression loading effect takes place on the inside surface of the process container (firing chamber), prestressing its inside surfaces. Firing chambers are illustrated in later figures.

As far as electrode materials and insulating materials are concerned, a certain burnup rate has to be expected, and these materials have to be replaced, either by dismantling the firing chamber (a hydraulic lock of the invention, discussed below, makes that arrangement practical to use in an industrial environment) and exchanging the used parts, or they can be continuously replaced. The central electrode can be fed into the firing chamber as it burns up, and the insulation around it can be extruded by an extrusion device mounted next to the electrode feed mechanism.

Depending on liquids to be processed, frequency of machine use, operating conditions, etc., the polarity can be either negative on the center electrode 12, causing electrolytic transfer of some material from the container wall and the concentric electrode 22 (which is in electrical contact with the container wall), or negative on the container wall, using up the center electrode more rapidly. Two opposing electrodes are also possible (shown in later figures); these can be adjusted externally by a mechanism as they are consumed, giving greater efficiency to the process but requiring a relatively complex feed mechanism.

What firing chamber design is used, what electrode arrangement and what materials are used in the process are subject to economic considerations, such as what liquids are to be processed, operating costs, permissible frequency and duration of service intervals, and so on.

Since all chemical compounds in the process liquid are being ionized, this method has a wide range of applications. Examples are the destruction of toxic waste, mineral recovery from waste, sewage waters and geothermal brines, the desalination of liquids, including the removal of nutrients that could cause bacterial growth, the processing of sewage water into irrigation water, etc. The machine can be used as a catalyst for chemical reactions and the photon flux can supply the energy for endothermic reactions.

Typical power levels are on the order of 20 to 25 kilowatts for a flow rate of approximately 40 gallons per minute through a machine, resulting in an overall operations cost of the equipment between 0.2 cent/gallon (high) and 0.05 cent/gallon (low), depending on the wear of the equipment.

These costs are important for the commercial applications of the process and the principal objective of the invention is directed toward bringing costs down per unit of production.

Since the conducted charges are quite high (for a 50,000 gallon/day machine they may be on the order of approximately 750,000 coulombs/day the difficulties experienced with this type of electrical discharge equipment have to do with the burnup of electrodes in the firing chamber and in the discharge switch serving the chamber. Therefore, the design of easily exchangeable electrodes in these parts is important for the usefulness of the electro-hydraulic process in commercial applications.

It also should be pointed out that the energy efficiency of the process increases with the firing chamber volume, and that machines in accordance with the invention can be built in any size.

A prototype built for a throughput of 50,000 gallons/day (at power consumption of 27 kilowatts) requires approximately $100 to $200 per day in cost of electrical power and spare parts. This makes a basic embodiment of the invention suitable for all the applications described, except for economic mineral recovery from seawater and its use for irrigation.

II. Firing Chamber, Electrode/Chamber Erosion, and Attenuation of Shock waves (FIG. 2).

Figure 2:
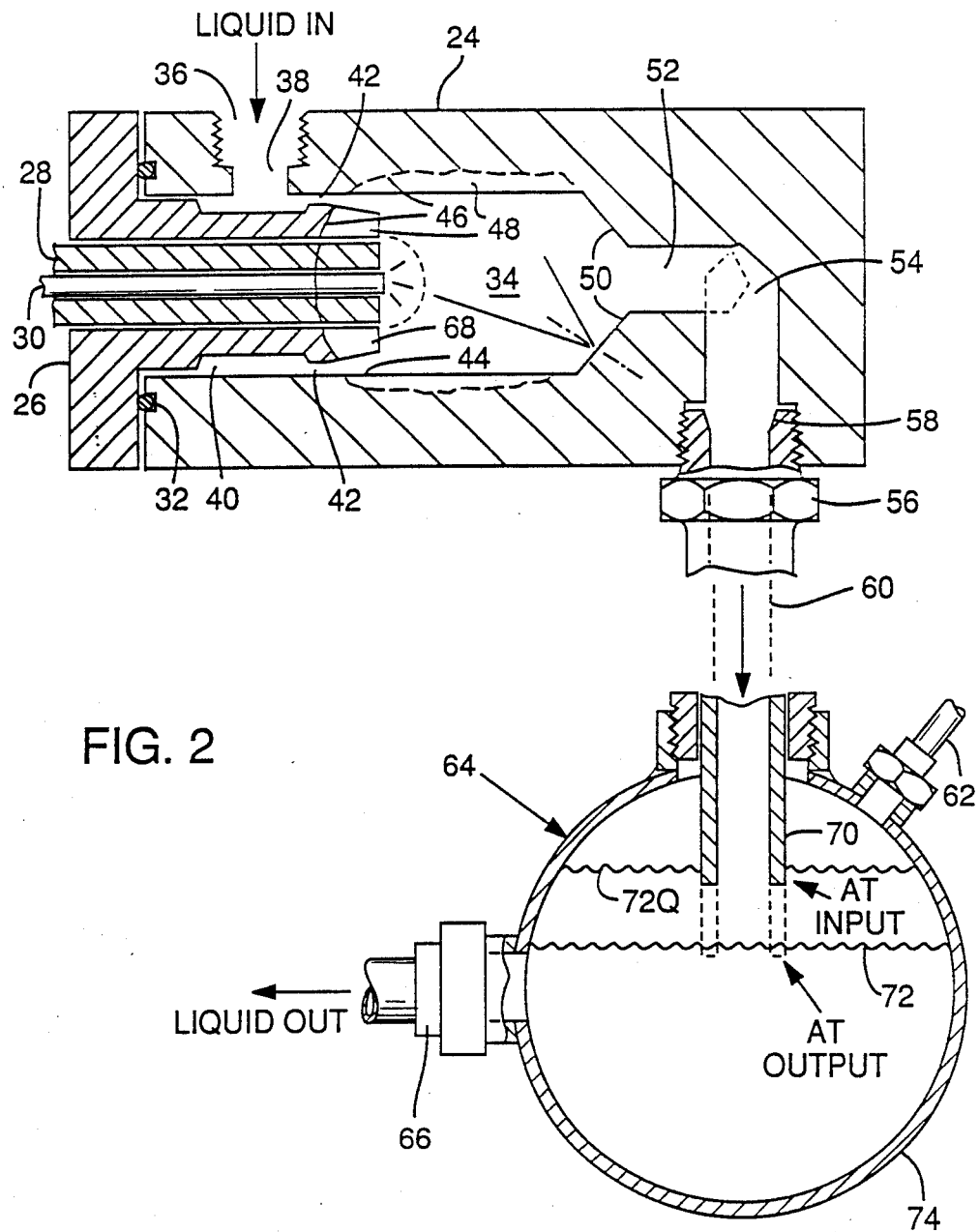
FIG. 2 is a schematic representation of a portion of a system such as may be included in the present invention, including a firing chamber and an external shock absorber, and illustrating construction principles for the firing chamber and adjacent components, for handling the shock wave associated with electro-hydraulic discharge and for handling the burn-up of the electrodes and firing chamber wall during the life of the firing chamber.

FIG. 2 shows an example of a liquid processing system (LPX) in accordance with one embodiment of the invention. Other configurations are possible and are discussed below.

The firing chamber body 24 in this embodiment may be designed for approximately 50,000 to 100,000 psi static pressure, and 500,000 psi dynamic pressure.

A firing chamber "lid" 26 or grounded electrode is held against the firing chamber body 24 by external hydraulic pressure (by structure discussed below in reference to FIGS. 4 and 5) or mechanically bolted to the firing chamber body (as by spring-loading, threads, bolts, etc.).

A bushing 28 comprising an electrical insulating sleeve is concentrically located inside the grounded electrode 26. Within the sleeve 28 is the center electrode 30, which may be stainless steel, nickel alloy, heavy-metal or copper-heavy metal alloy, depending on lifetime desired. This electrode can be fed into the chamber, together with a sacrificial sleeve 28 or independent of it, or the arrangement can be fixed and replaced periodically.

An O-ring seal 32 provides a liquid seal against process fluid leakage to the exterior of the preferably cylindrical firing chamber 34. At a process fluid inlet 36 there is a flow restriction 38. Adjacent to the inlet restriction 38 is a pressure equalizing volume 40 allowing pressure to equalize around the annulus of a gap 42 formed between the grounded electrode 26 and the firing chamber wall 44.

As indicated by a broken line 46 in FIG. 2, a sacrificial volume or burnup volume 48 is included in the electrodes and sleeve 28 and also in the firing chamber wall 44. This is the amount of material that can be lost without compromising the firing chamber performance.

The firing chamber 34 preferably includes a conical shock wave reflector 50 for reflecting the moving wave front and keeping it in the chamber 34 as much as possible. The process fluid exits the chamber through a fluid channel 52, and a shock attenuator 54 comprising a 90 degree sharp bend is included in the channel. A threaded fitting 56 with a conical inlet 58 may be rated for 5,000 to 10,000 psi operating pressure. A transfer line 60 leads from the fitting 56, and, depending on length, may have a burst pressure rating of 10,000 to 20,000 psi.

An air (or nitrogen) supply line is shown at 62, for feeding pressurized gas into a shock absorber vessel 64, which may be designed for about 800 psi maximum pressure, at operating pressures of between 50 and 150 psi. At 66 is a liquid outlet (or inlet) fitting (the flow through the firing chamber can be in either direction).

Proper damping of the generated shock wave energy in the process of the invention is crucial for the functioning of the system, since the equipment can be destroyed by unattenuated shock waves in a very short time. The hydraulic shock absorber structure 64 in FIG. 2 forms a part of the system of the invention. A second, similar hydraulic shock absorber (not shown) is used upstream of the liquid inlet 36.

The functioning of the hydraulic shock attenuation system is as follows:

The flow direction of the liquid through the firing chamber 34 has very little to do with the generation and attenuation of the shock waves from the discharge. The propagation speed of shock waves is large as compared to the speed of the moving fluid.

Fluid (wastewater, sea water, brine, etc.) enters the firing chamber through the inlet port 36, from a shock absorber which may be identical to that shown at 64. The space 40 is provided to give a uniform flow of liquid through the gap 42.

A conical section 68 of the electrode 26 helps attenuate the shock wave energy to an extent, along with the fact that the shock is generated in the opposite direction. This enables a fluid connection rated at about 1/20 that of the pressure rating of the firing chamber body to be used.

In the forward direction, the conical section 50 of the firing chamber reflects most of the shock wave back at different angles, and so avoids nodes of concentrated pressure from reflected waves. (This is for pulses generating pressure waves which are short as compared to the firing chamber dimensions.)

In fact, the shock wave energy is attenuated by multiple reflections inside the firing chamber 34 and is generally turned into a "white noise." The channel 52 together with the 90 degree angle at 54, provides for a very high flow resistance for fast pulses of "water hammer," and at the walls of the space 54 the rest of the shock energy coming down through the channel 52 is reflected back into the chamber.

Moreover, the attenuation of the primary shock is not the only item of concern. Gases generated by the electrolytic action of the current and by the chemical reactions of the compounds dissolved in the fluid generate expanding gas bubbles that accelerate the fluid out of the firing chamber. This amounts to a secondary "shock," smaller in amplitude, but longer in time.

So as not to disrupt the flow of the liquid by this action, differential flow resistance is built into the design. (If enough gas is precipitated, the firing chamber could be acting as its own pump because of the difference in dynamic pressure in the feed lines in and out, and the inertia of the water columns.)

The flow resistance of the gap 42 increases dramatically with the liquid velocity At the 90 degree bend 54 there is also an increase in resistance, but to a lesser degree. Therefore the liquid has a tendency to move from point 38 to the fitting 56 as shown on the drawing, and not in the other direction.

The pressure rating of the inlet and outlet feed lines 60 depends to a great extent on their length. The pressure drops approximately linearly from the point 54 to the end of an input tube 70 in the shock absorber 64. The liquid level 72 is held near the tube end by a small supply of gas (air, but nitrogen if the oxygen is detrimental to the gases generated by the reactions).

The high liquid level 72a shown in the drawing is for the input shock absorber design, while the low level 72 is indicated for the output side. Through the gas supply 62 the external gas is supplied at a quantity or flow rate large enough to cover the loss of gas by turbulence in the container body 74, i.e. by mixing or dissolving of the gas into the liquid.

Since the flow resistance from the end of the tube 70 to the liquid surface is small, the tube back pressure is essentially the same as the gas supply pressure.

At 66 is shown the output (or input) connection fitting to the system, running at a constant 100 to 150 psi depending on flow resistance of the firing chamber-hydraulic connections, etc. Any primary shock wave energy coming down the lines is dissipated in the large volume of liquid in the shock absorbers and at the liquid surface therein.

The hydraulic fittings on the firing chamber have to be conically enlarged, as shown at 58, in order to prevent axial loading of the threads, that have been shown to fail if ordinary stepped fittings are used having a shoulder at this location. By using a chamfered bore, however, the dynamic pressure expands the fittings slightly and actually has a tendency to swage them in even tighter.

It should be pointed out that several pounds of the firing chamber material can be lost due to erosion and electrolytic action without compromising system performance. If the center electrode is held at negative potential, the lifetime of the entire arrangement is greatly enhanced. This is desirable for fixed mounted center electrodes 30, and sacrificial sleeves 28. For continuously replaceable center electrodes and fed sleeves or long lasting composite sleeves, a positive polarity on the center electrode prevents electrolytic erosion of the firing chamber body and of the lid 26. Depending on service intervals allowable and the design selected, either electrode material or firing chamber material can be selectively sacrificed. Therefore, if a fixed center electrode 30 is used, of heavy and corrosion-resistant construction, this electrode should generally be negative, with the firing chamber walls having the positive polarity where wear will occur. On the other hand, with a continuously fed electrode and surrounding insulative sleeve, the center electrode can be positive.

In order to keep the process functioning properly, the discharge from the energy storage bank must be prevented from overswinging in a negative direction; otherwise, both electrodes will be depleted electrolytically, and the lifetime of the equipment will be greatly reduced. Therefore the discharge circuit (is inductance and damping resistance) must be properly adjusted to the conductivity of the liquid and its plasma.

In one embodiment, i.e. a prototype, a fixed electrode 30 is used, and insulating bushings 28 are made from quartz or nylon, and therefore the center electrode 30 (tungsten) is run at negative potential.

The shock absorbers in the one preferred embodiment of the machine are about eight inches in diameter, and the liquid volume of the firing chamber may be 1/20 gallon. The gas volume in the shock absorbers 64 is approximately 5 times the volume of the firing chamber, and that arrangement has been found to work very well.

III. Overall System of One Embodiment (FIG. 3, 3A, 3B)

Figure 3:
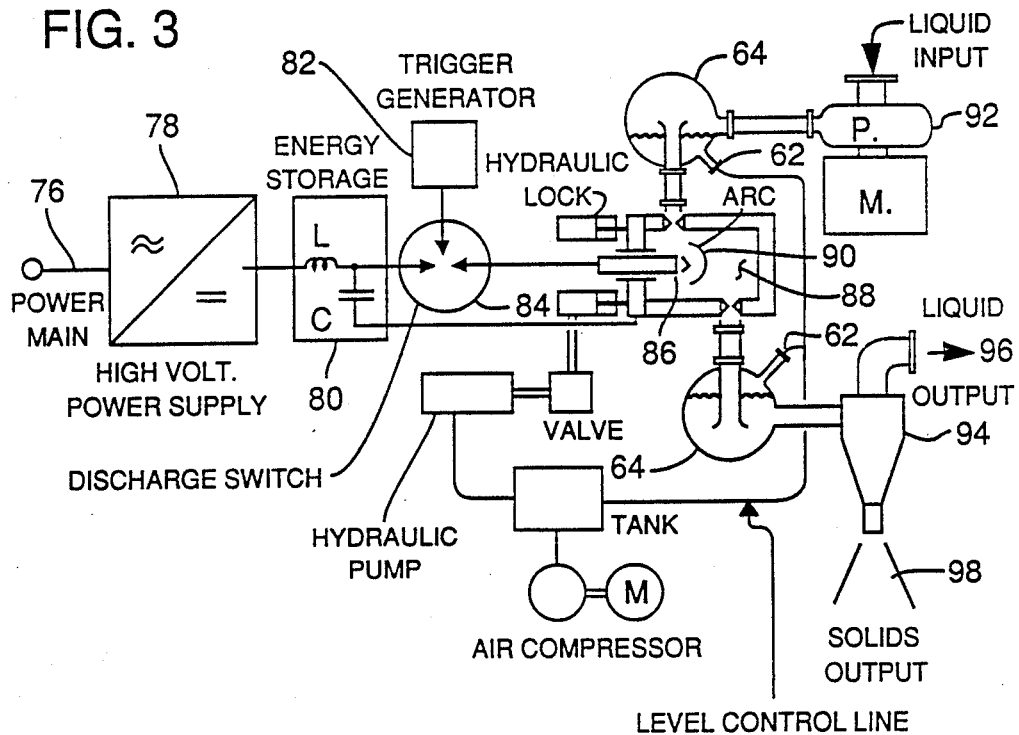
FIG. 3 is a schematic drawing of the system, showing a layout of an entire system in accordance with the invention, including the firing chamber, upstream and downstream hydraulic shock absorbers, power supply, discharge switch, liquid input/output and auxiliary systems.
Figure 3A:
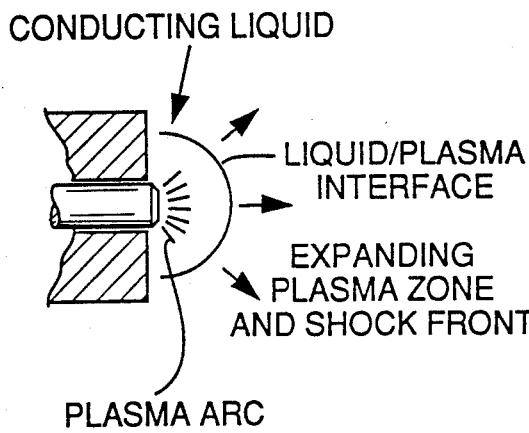
FIG. 3A is a detailed view illustrating a coaxial type electrode arrangement.
Figure 3B:
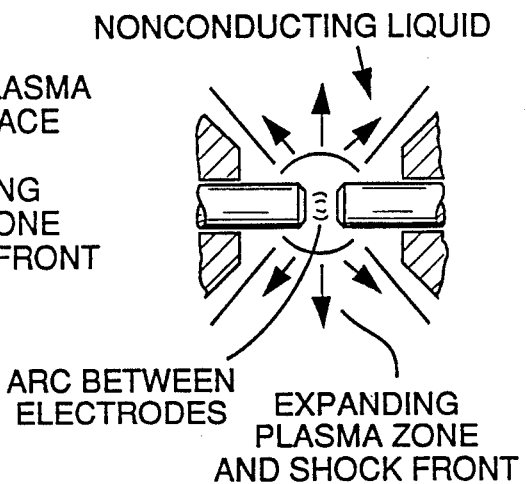
FIG. 3B is a view similar to FIG. 3A, but showing an opposed electrode arrangement.
Figure 3C:
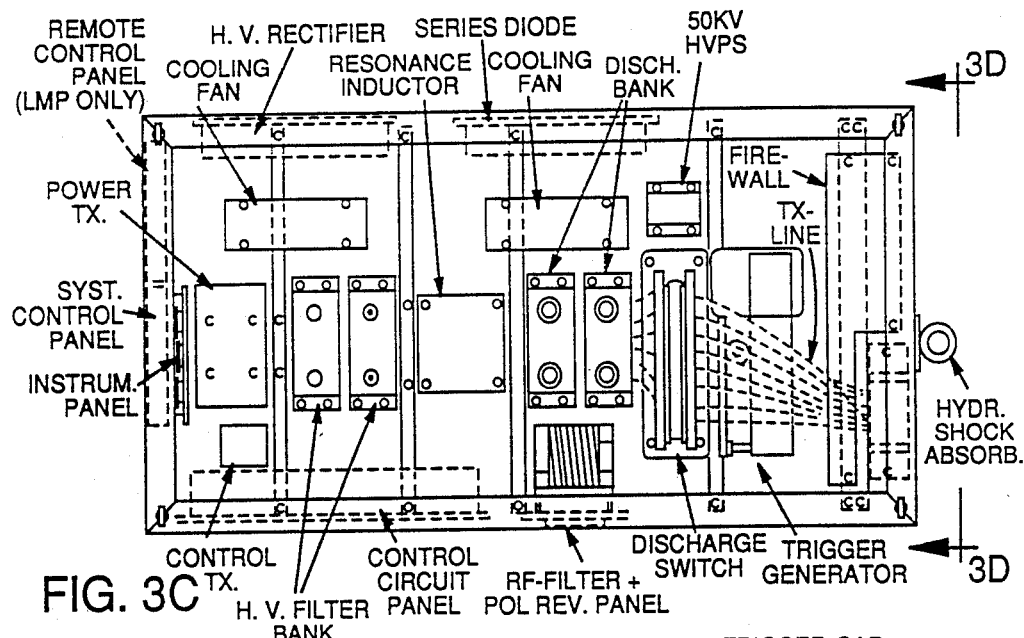
FIGS. 3C, 3D and 3E show in plan, end elevation and side elevation a prototype system built in accordance with the invention, and the location of principal components in an actual assembly.
Figure 3E:
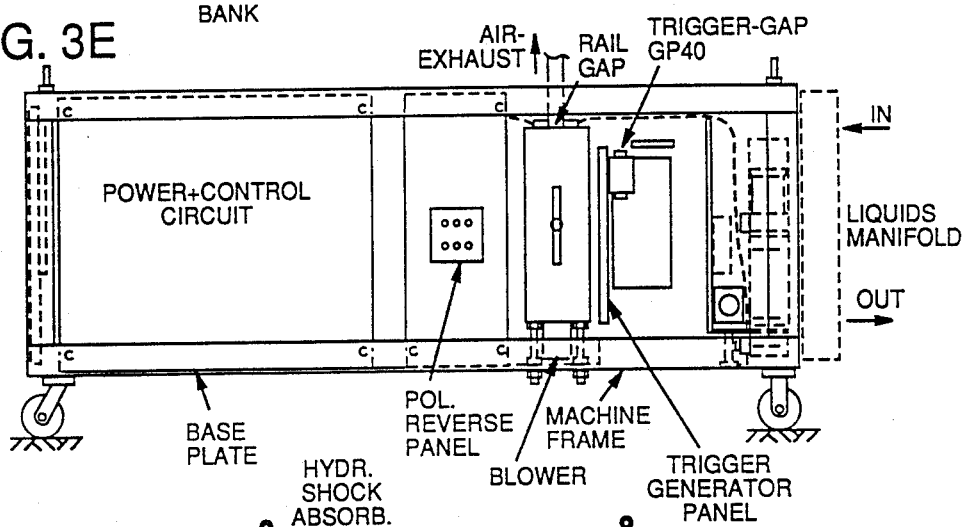
Figure 3D:
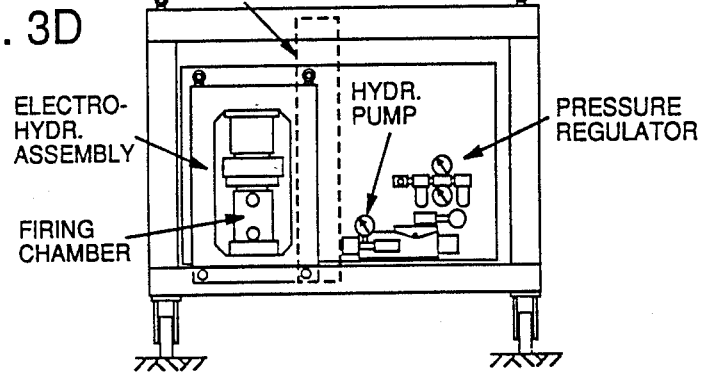

The schematic diagram of FIG. 3 shows one preferred embodiment of the overall system of the electro-hydraulic liquids processor. FIGS. 3A and 3B show coaxial electrodes, wherein the firing chamber body is normally grounded to the outer electrode; and an alternative arrangement wherein a pair of opposed positive and negative electrodes are both in the form of rods. FIGS. 3C, 3D and 3E show arrangement of components in an actual assembly.

Referring to FIG. 3, power from a power main 76 is stepped up in a high voltage power supply (HVPS) 78, and charges an energy storage bank 80. This can be a capacitor bank (as shown) or an inductive store, or the energy can be supplied by an electromechanical pulse generator. When the bank 80 is charged, a trigger generator 82 fires the discharge switch 84, and the bank discharges its energy through the electrode 86 into a small volume of liquid 88 around the tip of the electrode.

The generated plasma expands, creating a shock wave 90 and a burst of light, which propagates through the liquid volume.

All electrical bonds between the molecules of the compounds dissolved in the liquid and the liquid itself are in essence temporarily canceled. The generated turbulence from the shock and the shock wave itself and its rarefaction zone precipitate dissolved solids out as insolubles (unless they are directly reactive with the liquid itself, or with each other). In the rarefaction zone, the solid compounds congeal into micron-sized particles that can be removed by simple filtering techniques. The flow restrictions in the firing chamber, in and out, provide for the reflection of the shock wave energy as discussed above, and the hydraulic shock absorbers 64 attenuate the rest, preventing damage to pipes and pumps of the system.

Since the discharge pulses are in the order of tens of microseconds (at a discharge current between 10 and 300 kiloamperes for a chamber volume of 1/20 gallon to one gallon), the wave length of the shock wave is on the order of a few inches.

Therefore, no valves are needed to close the firing chamber, and a continuous liquids exchange can be used.

As a pump 92 pumps the liquid through the firing chamber (constructed to withstand several hundred thousand psi peak pressure), the precipitated particles are carried by the advancing liquid stream into a centrifugal separator 94 (or any other kind of filtering device), where the solids are separated from the liquid and the liquid is then discharged at 96 and the solids (approximately 50% to 70% liquids content) are collected (98).

A level control line keeps the liquid level in the shock absorbers constant. The air lines 62 contain orifices to limit flow rate of air (or other gas) into the shock absorbers 64, and air is constantly being passed out of the shock absorbers with the liquid flowing through; the pressure inside the vessel is always less than the supply pressure from the air compressor.

The pressure drop of the firing chamber of the embodiment illustrated is approximately 50 psi, and the pressure drop in the separator 94 may be set to 60 psi.

In tuning of the firing chamber, experimental results have shown that different energy levels (and different discharge lengths) favor the precipitation of different chemical compounds from a mixture of all compounds, as should be expected by such a photolytic process.

In experiments performed with the illustrated embodiment, the shock front 90 traveled throughout the liquid volume while the discharge from the electrode was still active. The peak discharge current occurred at approximately ¾ the traveling distance of the shock front along its longest path length.

FIGS. 3C, 3D and 3E show in plan, end elevation and side elevation views a preferred assembly of a liquid processing system of the invention. These view show arrangement of most of the system components shown schematically in FIG. 3, with principal components labeled.

IV. Firing Chamber Configuration—Hydraulic Lock (FIG. 4 and 4A)

Different engineering approaches to the firing chamber design are possible and are encompassed by the invention. The electro-hydraulic assembly 100 as shown in FIGS. 4 and 4A is intended for industrial applications of the machine; variations are contemplated for increased machine performance and for various operating modes.

The liquid processing system (LPX) may be run with two different types of insulators, one from nylon and one made from quartz. A nylon electrode sleeve 102 is shown in FIG. 4.

Figure 4:
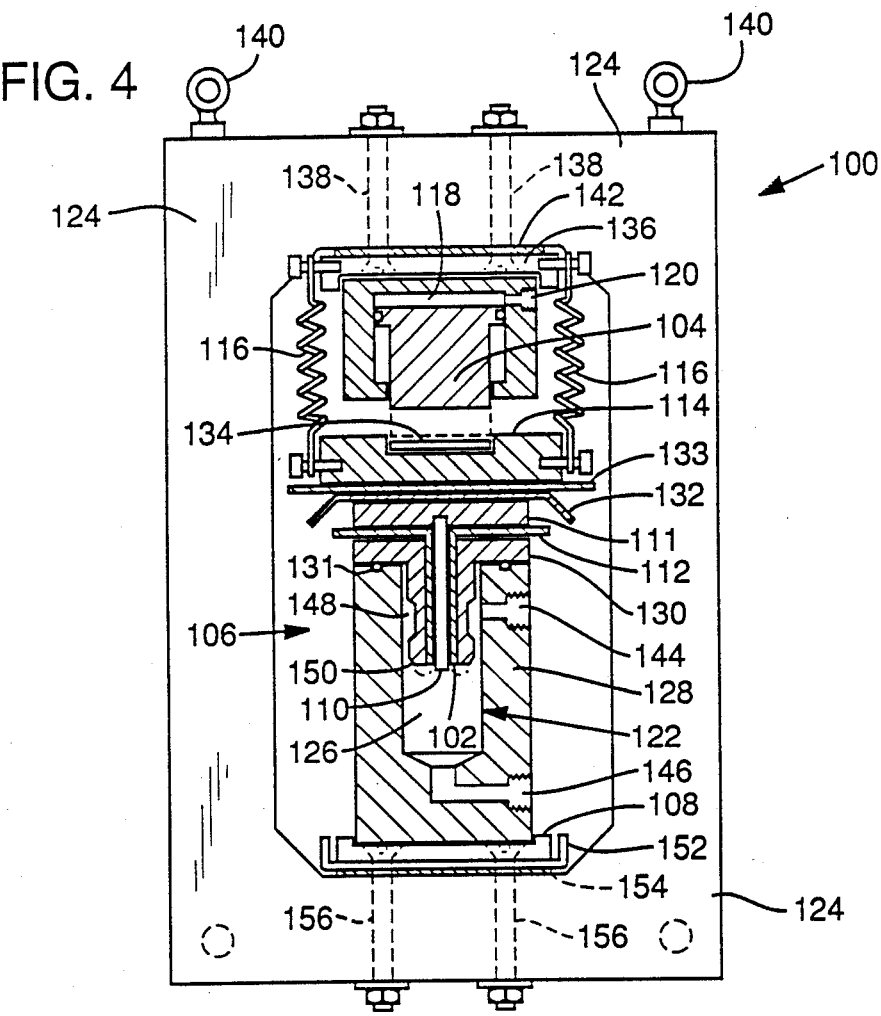
FIG. 4 is a sectional view showing a preferred firing chamber construction wherein the firing chamber assembly is held together by hydraulic pressure and with provision for facilitating convenient exchange of firing chamber components as they are used up.
Figure 4A:
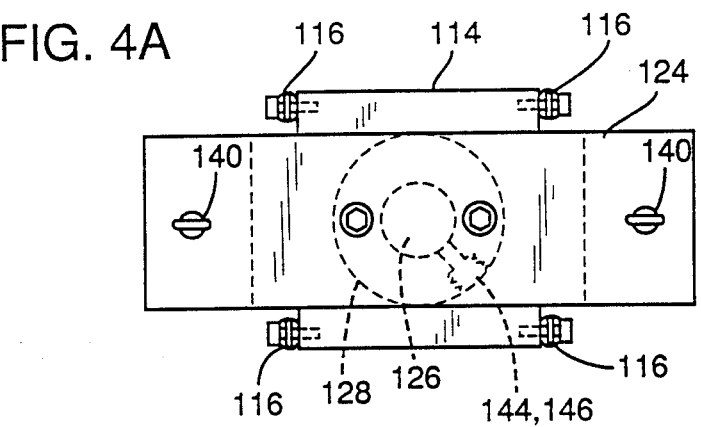
FIG. 4A is a top plan view of the firing chamber construction of FIG. 4.

Shown in the drawing of FIG. 4 is the firing chamber assembly of the machine of this embodiment, and the mounting arrangement or assembly arrangement of the accompanying components.

By lifting an hydraulic piston 104 to an upper position as indicated in solid lines, the entire firing chamber assembly 106 can be lifted from a lower cradle 108, and the center electrode 110 and connected anvil 111 and insulator 112 at a head end of the assembly can be replaced in a matter of a few minutes. A load transfer plate 114 may be biased by retraction springs 116 (four may be provided) toward an upper position (shown in lower position), moving the piston 104 up as it rises. With this movement, hydraulic fluid moves out of an hydraulic cylinder 118, exiting through an inlet port 120. With the piston 104 retracted, this leaves the components at the top of the firing chamber 122 available for removal and replacement. A frame 124 (as of structural steel) supports these components and provides a rigid framework against which the hydraulic force acts.

The fluid lines used are flexible hydraulic high pressure hoses and need not be disconnected for this service operation.

This "hydraulic lock" of the firing chamber structure is an important feature of the invention, since it provides operator convenience and time savings, on a machine in operation.

The illustrated arrangement may be called the electro-hydraulic assembly, and comprises the most highly stressed part of the system of the invention.

The liquids processing takes place in the liquid volume space 126 of the firing chamber 122.

The hydraulic pressure from the hydraulic ram or piston 104 not only holds the firing chamber closed against the explosive pressure generated by the plasma arc, but also provides the liquid seal between the firing chamber body 128 and the grounded electrode 130 (a seal is provided at 131), between the grounded electrode 130 and the coaxial insulator and pressure seal 112, and between the insulator/pressure seal 112 and the anvil/electrode holder 111. Also, this arrangement provides the contact pressure necessary for electrical connections between the lower cradle 108 and the firing chamber body 128 (for the grounded electrode) and between an electrical power connecting plate 132 and the anvil 111 (for the center electrode). An electrical insulator pad 133 insulates the power plate 132 from the load transfer plate 114 above.

Another important feature of this arrangement is in the self-aligning of the assembly with the hydraulic cylinder 118, by the use of a nylon disc 134 that liquefies under the hydraulic pressure and allows for self-centering and axial alignment of the force applied by the piston 104. This prevents side loading and wear of the piston in the cylinder 118, and assures an equal pressure necessary for a positive sealing action of the firing chamber parts around their circumference. Manufacturing tolerances, i.e. variations from part to part, are taken up in this way.

The retracting springs 116 hold the upper assembly in place, i.e. they retain the cylinder 118 against an upper cradle 136 (retained to the frame 124 by bolts 138), and the load transfer plate 114 against the lower end of the piston, as discussed above.

The described hydraulic firing chamber lock assembly is especially useful for constructions wherein the electrodes have to be replaced manually and are not fed automatically into the firing chamber, since frequent refurbishing might have to take place.

Another feature of the hydraulically operated firing chamber is that the firing chamber components are preloaded by the external pressure, and therefore the alternating, internal pressure does not fatigue the firing chamber body 128 as much as it otherwise would.

The heavy assembly frame 124 shown in FIGS. 4 and 4A helps to keep down vibrations caused by the operation of the firing chamber. The firing chamber is also designed in such a way that the weight of the firing chamber body approximately equals the weight of the "lid" (i.e. the parts 111, 112 and 130 as well as the electrodes and insulator themselves) and the plate 114, thus resulting in cancellation of the vibration generating forces in the up-and-down direction, and keeping the frame steadily at the same location.

The following further components are shown in the schematic assembly views of FIGS. 4 and 4A: A pair of lifting eyebolts 140 secured to the frame 124; a pressure pad 142 (e.g. brass or copper plate) between the frame 124 and the upper cradle 136; process fluid inlet and outlet ports 144 and 146 in the firing chamber body 128, communicating with the liquid process volume 126; a manifold volume 148 in the firing chamber/process volume, for evenly distributing the input process fluid; a shock wave attenuator gap 150 in the firing chamber, as discussed above (FIG. 2); a grounded electrical power connection 152 in electrically conductive connection with the firing chamber body 128; a bottom pressure pad 154; and bottom connecting bolts 156.

Figure 5B:
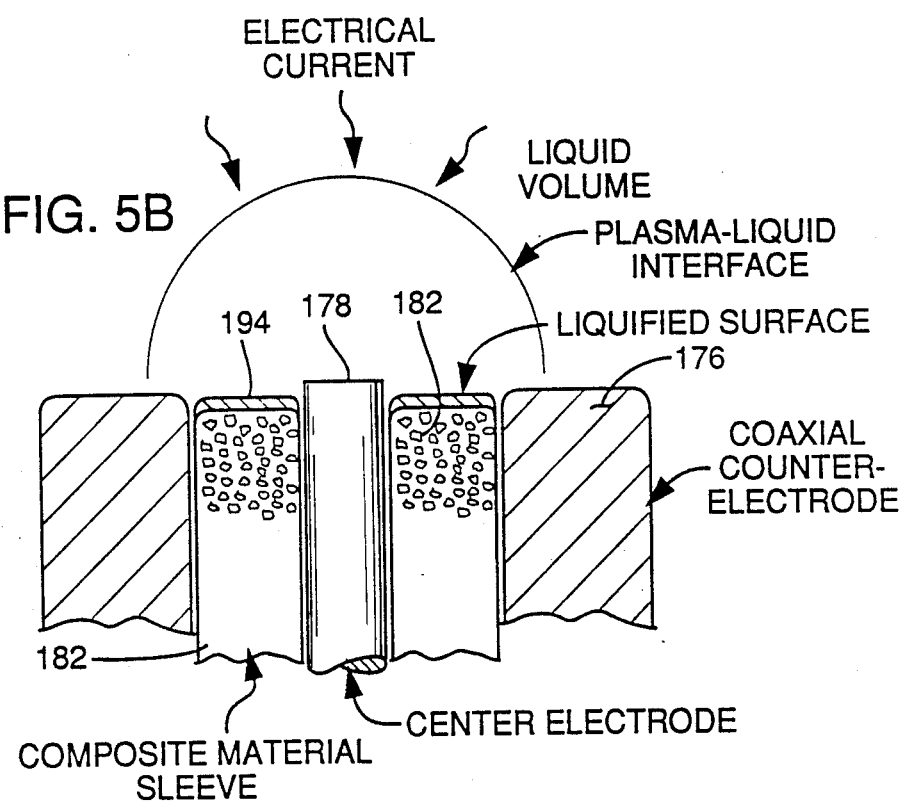
FIG. 5B is a detailed view showing a coaxial electrode arrangement, with an insulating sleeve formed of a special composite material for longer life.

V. Variations of LPX Firing Chamber; Electrode Feed Mechanism, Flat Plate Transmission Line and Methods for Generating Faster Pulses (FIGS. 5, 5A, 5B).

Figure 5:
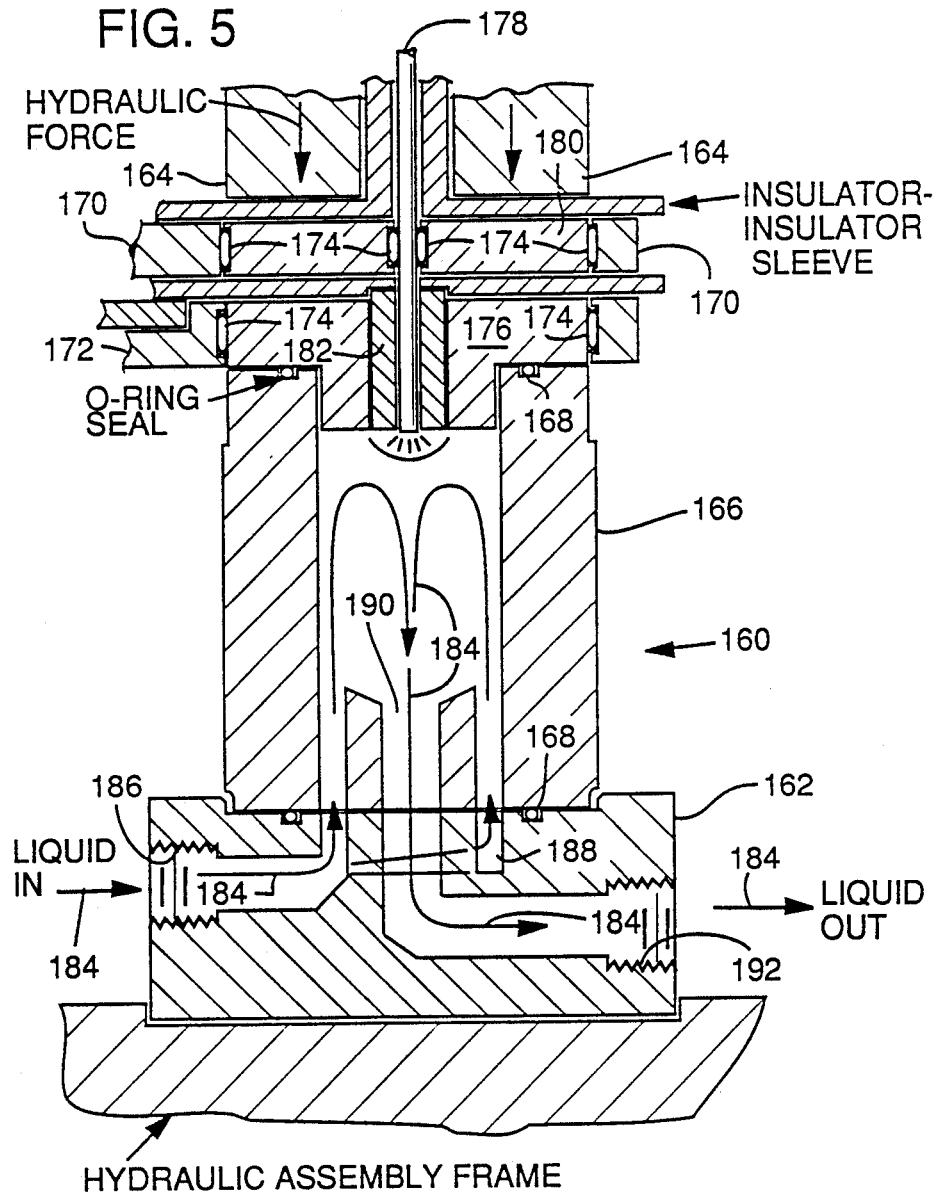
FIG. 5 is a fragmentary sectional view showing a portion of a modified firing chamber construction wherein liquid infeed is from the bottom of the chamber and outflow is through the bottom center, and showing an electrode feed arrangement.
Figure 5A:
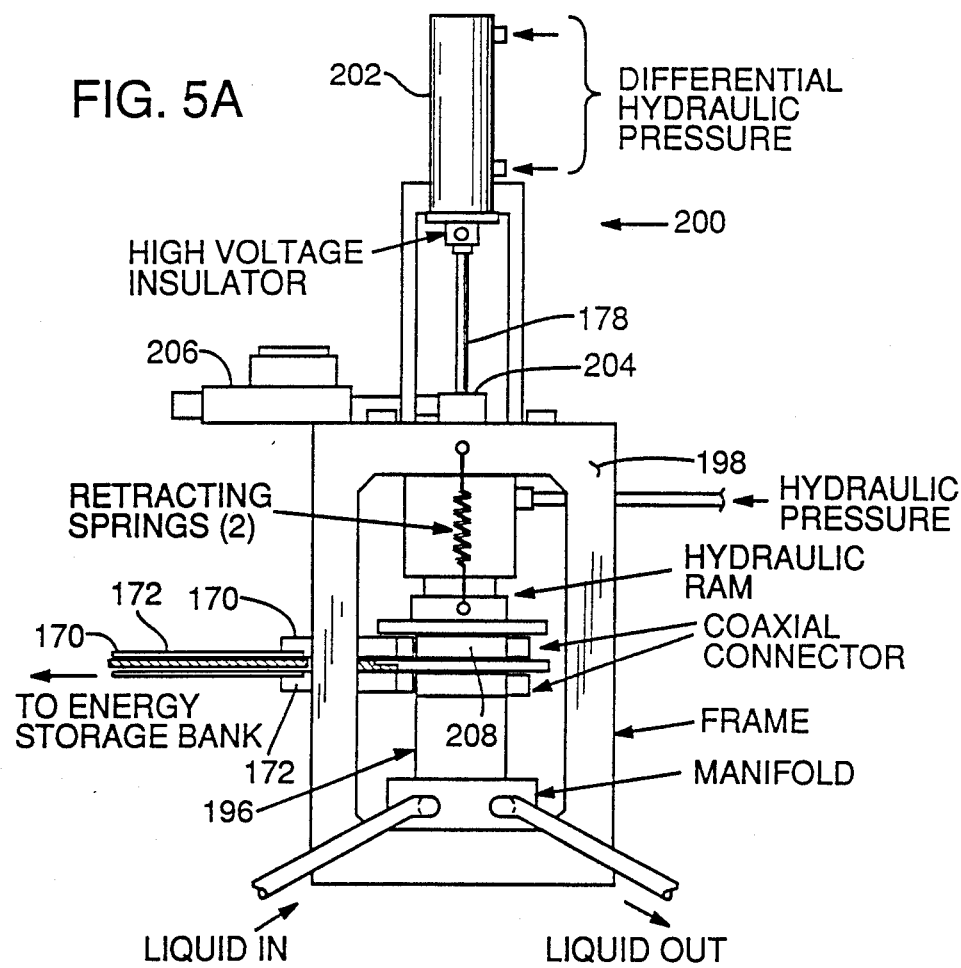
FIG. 5A is a schematic view showing an overall firing chamber assembly, including a fed center electrode apparatus, and extrusion device for extruding an insulator sleeve which follows the advancing center electrode, and other components involved in this embodiment of a firing chamber construction.

The drawing of FIG. 5 shows an alternate configuration 160 of the LPX type firing chamber. In this case an external liquids manifold 162 is used. When the hydraulic ram 164 is withdrawn (generally as discussed above), the firing chamber body 166 can be lifted off the manifold and carried elsewhere for rebuilding without the need to disconnect hydraulic lines. In this embodiment the firing chamber is connected both at top and bottom by pressure seals (O-rings are shown at 168, top and bottom), providing for easy disassembly of the parts. Coaxial connections to flat plate power transmission lines 170 and 172, via spring contacts 174, are easily released when the hydraulic ram 164 is withdrawn, leaving the "lid" (grounded electrode 176) free. For the center electrode 178, a conductive disc 180 transfers current to the electrode via the spring contacts 174, as shown.

In this arrangement the center electrode 178 is fed into the chamber by an external mechanism (e.g. a cylinder actuator as in FIG. 5A), but the insulating sleeve 182 is not. The insulating sleeve is made from a composite material of high temperature resistance (e.g. carborundum, quartz) and a carrier material that absorbs the mechanical shock and substantially liquefies under shock wave pressure (e.g. teflon, polyolefins).

FIG. 5B shows schematically the assembly of the composite insulator 182 and the center electrode 178. The insulator 182 absorbs and attenuates the shock. Its carrier material melts and evaporates at the surface 194. The quartz or sapphire particles then form a burnup-resistant film on the surface 194, so that insulator life is extended without "feeding" an insulator into the chamber.

As indicated by arrows 184, flow of process liquid in this embodiment is from an inlet port 186 to an annular inlet channel 188 into the chamber, then out through a central exit channel 190 and an exit port 192.

The drawing of FIG. 5A shows an LPX type firing chamber 196 and frame 198 fitted with an electrode feed mechanism 200 in accordance with the invention. This may be in the form of a hydraulic cylinder 202 as shown, capable of adjusting the position of the electrode rod 178 reaching down into the firing chamber. An insulating sleeve extruder as shown at 204 (with associated extruding equipment 206) provides a continuous replacement of the insulated sleeve component, as both the center electrode and the sleeve around it are used up.

In this way, the down time of the machine can be reduced greatly, making a more profitable operation possible. Also with this arrangement, higher discharge currents can be used (using the flat plate transmission line 170, 172) resulting in hotter plasma operation, shorter wave length of light with greater ionization-potential, and therefore more efficient operation and savings in energy. (The entire light spectrum of the arc is shifted more toward the ultraviolet due to hotter operation.)

The electrical connection to the center electrode is made by two spring-loaded metal blocks (not shown). The insulating sleeve flows around them under the pressure of the extruder. This arrangement is located inside the connector 208 of the center electrode.

VI. Opposed Electrode Arrangement; Conductive Coolant Fluid as Trigger; Fixed and Extruded Insulator Sleeves (FIG. 6).

For nonconductive fluids and/or for greater firing chamber efficiency, opposed electrodes should be used. Because of the inductance of such an arrangement, higher operating voltages have to be generated. The higher voltages are also necessary to break through the gap in the case of nonconductive process fluids (hydrocarbons, etc.). Since the shock wave and the light energy can spread out in all directions, here an increase in efficiency of about a factor of two can be realized.

Figure 6:
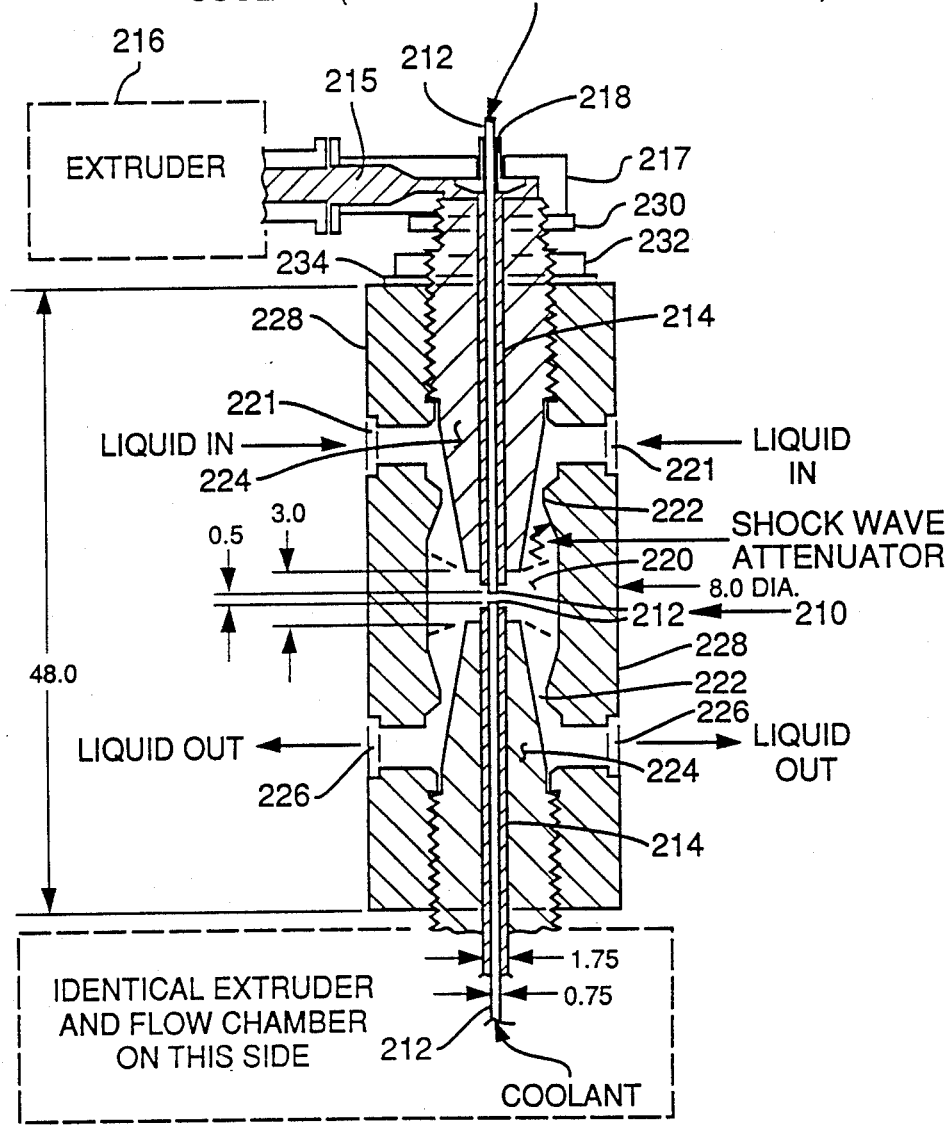
FIG. 6 is a sectional view showing another embodiment of a firing chamber in accordance with the invention. In this embodiment the electrodes are opposed, with both electrodes fed into the chamber and including a fed, extruded insulating sleeve around each electrode.

Shown in the drawing of FIG. 6 is a firing chamber 210 designed for a flow rate of, for example, two million gallons per day, using fed electrodes 212 and extruded thermoplastic insulating sleeves 214. The position of the electrode tips is electronically sensed and the feed mechanism driven accordingly.

The feed rate of the extruded insulating sleeves is adjusted by driving the extruder 216 motor (or piston, etc.) at the proper rate. The sleeve extrusion material 215 is forced through a flow chamber 217 as shown. (Chamber held to electrode holder using threads and nut 230).

High power connections are made at the outside of an insulating seal 218, using laminated contact springs (multilam connections).

The discharge current may be approximately 300 kiloamperes peak for this operation, and the energy used per gallon of fluid (the space indicated at 220) may be about 16 kilojoules. Because of the skin effect occurring at this high discharge current, the electrodes must be internally cooled and are therefore hollow, with a bore of about $\frac{3}{8}$ inch diameter (see FIG. 7).

The fluid to be processed enters through two opposing process liquid ports at 221, passes through a narrow gap 222 (e.g. 6 inch diameter) between the firing chamber wall and a conical electrode holder 224, and arrives at the process space 220, where it is irradiated.

The fluid then leaves through an identical output arrangement with outlet ports 226, as shown in the drawing.

The firing chamber body 228 preferably is constructed from steel with a yield strength of 180,000 psi; the electrode holders 224 may be Type 416 heat treated stainless steel with replaceable protective threaded nuts on their tips (not shown). A spring-loaded washer 234 preferably is used between a nut 232 and the firing chamber body 228, at the outer end of the electrode holder as shown.

The fluid used for electrode cooling is the same as the process fluid. A small amount is diverted and pumped through the hollow electrodes 212 by a high pressure pump, and it exits the electrodes into the process volume. Operating voltage for this arrangement may be 20 to 40 kilovolts, depending on the process fluid. In the case of a nonconducting process fluid, the electrode cooling fluid can be made conductive (salt water, etc.) and can act as an initiator for the plasma discharge, or it can be doped with certain elements emitting light at a selected wavelength-peak for specifically exciting certain chemical bonds.

Attenuation of the shock wave energy is achieved by the fact that multiple reflections occur between the electrode holders 224 and the converging space of the firing chamber, as shown in FIG. 6. By the time the shock front reaches the flow gap 222, it has lost most of its energy.

The converging/diverging flow channel also guides the fluid into the process region 220 without causing great turbulence and mixing between already processed and new incoming fluid, avoiding wasting of energy by having to process some of the fluid volume twice.

Schematically, the machine is identical to the system described above, except for the higher-power feature, requiring a larger power supply, storage bank, etc.

The incoming and outgoing fluid passes through external hydraulic shock absorbers in the same manner as explained above (not shown in this drawing).

Figure 7:
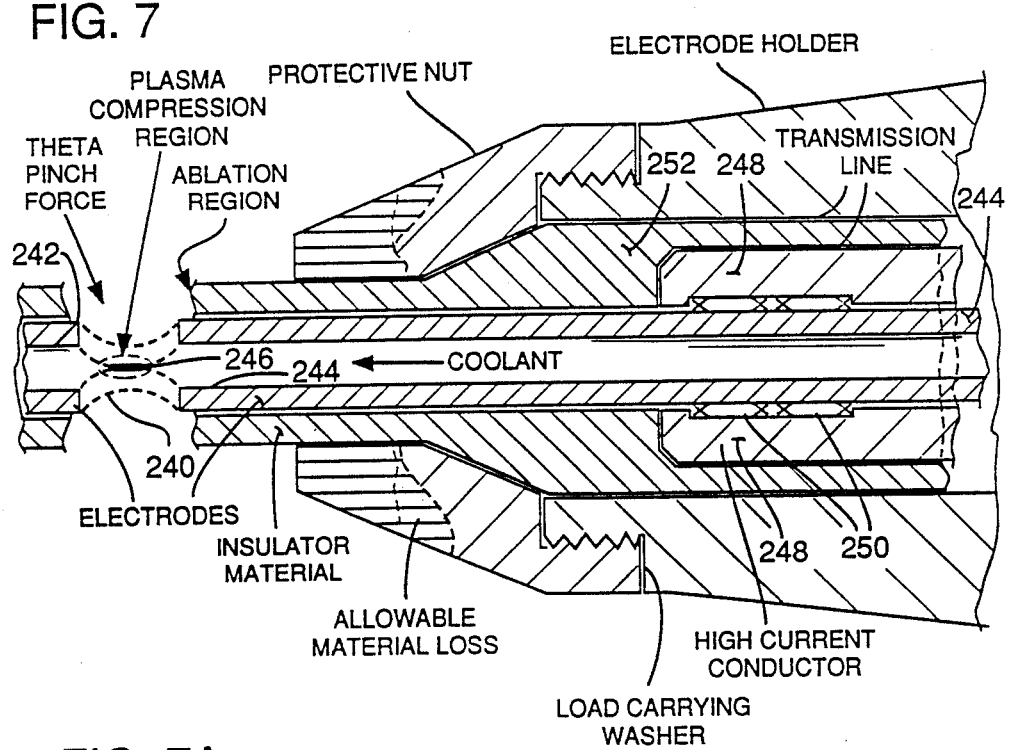
FIG. 7 is a sectional view showing a portion of an electrode assembly wherein the electrodes are opposed and the arc radiation is shifted toward shorter wavelength using plasma compression.

With this type of firing chamber layout, i.e. with opposed electrodes, a further increase in efficiency can be realized by using larger-diameter, thin-walled electrodes in combination with vary fast pulses, as shown on the drawing of FIG. 7.

Figure 7A:
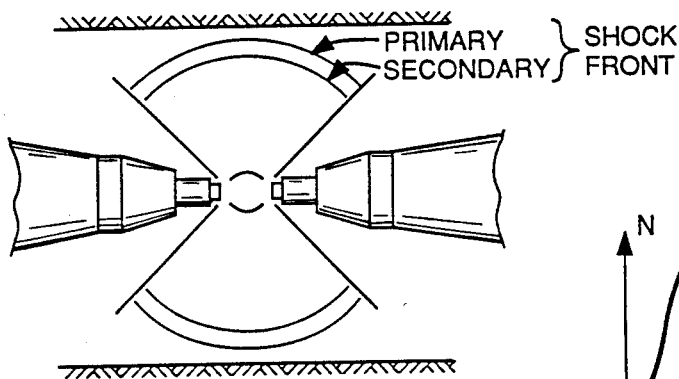
FIG. 7A is a schematic representation illustrating the pattern of shockwave fronts which can occur with plasma compression.
Figure 7B:
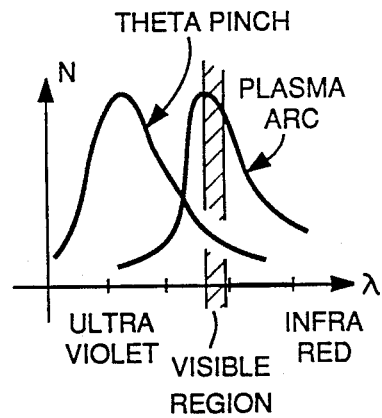
FIG. 7B is a graph plotting energy versus wavelength in the plasma compression or theta pinch mode of operation.

VII. Plasma Compression Chamber and Short Wavelength Generation (FIG. 7, 7A, 7B).

Different chemical compounds and elements require different dissociation energies. However, in a bulk process like the arc-generated electro-hydraulic process, much of the radiated energy (approximately ½ of the supplied energy into the arc) is in the infrared region. The energy associated with these photons might be too low to ionize the compounds/elements in question.

Therefore, it is apparently desirable to use plasma temperatures as high as possible, since the radiated light has a tendency to decay toward the longer wave lengths in any event. Therefore, unless one wants to excite certain bonds and not others, which would require irradiation at narrow light bandwidths, higher plasma temperatures would correspond to greater system efficiency.

Referring to FIG. 7, the plasma temperature can be raised by a "theta pitch" type plasma compression. In that process a cylindrical plasma structure collapses inwardly on itself, as at 140, building a fine, highly compressed filament having a high temperature. The kinetic energy of the magnetically driven imploding plasma ring 240 is converted into extra heat during the compression phase.

The principle behind this process is that the increasing magnetic field associated with the discharge current through the opposed electrodes 242, 244, and driven by the discharge current itself (the movement of the ionized matter) results in a motoring force that accelerates the ions inward in a radial direction.

There are two shock fronts generated by this process (shown in FIG. 7A). Depending on the discharge current waveform, a primary shock front is generated by the exploding outer plasma shell, at a time when a magnetic field is still relatively weak. Following this primary front is a secondary, very steep shock wave caused by the explosion of the collapsed plasma ring that occurs when the radially accelerated plasma atoms bounce off each other in the center 246 between the two electrodes.

To provide a strong enough magnetic field for this process, the electrical pulses must be very short in order to provide the required discharge current (at a given energy per pulse). The hollow electrodes 242, 244 used to generate the plasma ring would be too small in diameter and too long (from the connection to the discharge in the middle of the firing chamber), resulting in too high a circuit inductance and resistive losses. Approximately 10 nanohenries inductance is allowable for the 500 kiloamperes to 1 megaampere current.

Therefore the current is carried by a coaxial sleeve 248 to the front end of the electrode. Sliding contact springs 250 carry the pulse current to the electrode 244.

The insulation 252 for the coaxial system is provided by extruded material (nylon, teflon, etc.) which is fed into the system as shown previously. The hollow electrode 244 is cooled as explained before—a pump pushes coolant fluid (which may be electrically conducting) through the electrodes and cools the coaxial transmission line 248 as well as the electrodes. For a 500 kiloampere pulse system, a few kilowatts of cooling power are required, depending on the pulse width (in the microsecond region) and the surfaces of the transmission line (silver/rhodium plating reduces the skin effect losses greatly).

It should be pointed out that the energy required to drive such a system is actually less than for the same system operating in a non-theta pinch mode (also referred to as "plasma bounce"); approximately 2 kilojoules per liter of fluid would be an average value.

There is also a shock wave traveling down the length of the bore of the electrode 244, but its attenuation at the electrode end is not a problem.

Energy for such a system can be supplied from a capacitor bank through a flat plate transmission line (not shown in FIG. 7), which feeds into the coaxial electrode holder/transmission line 248 just outside the extrusion-mechanism. The system is quite similar to the opposed electrode-arrangement described earlier, that operates in a regular non-compression mode of operation.

The specifics of the plasma-bounce arrangement are as follows: the protective nut at the tip of the electrode holder, which is a replaceable item since material loss is to be expected there; the better electrical parameters tailored for faster pulses; higher current discharge switches must be used; and the sleeved electrode arrangement keeps the inductance and skin resistance down.

The drawings of FIGS. 7 and 7B show how the plasma ring is compressed into a thin, very hot filament 246 that radiates in the far ultraviolet region (FIG. 7B), and how the extrusion process provides the required electrical insulation for the electrodes. The insulating sleeve is continuously extruded between the electrode holder and the high current conductor, and through a narrowing conical space toward the electrode tip. The high current is carried not through the entire length of the electrode, but through the high current conductor (generally on its outer skin) and then through the contact springs, as explained above, into the electrode itself. In this way the full length of the electrode under high current conditions is avoided. This avoids the high inductance and resistance which would be encountered if the full length of the electrode were used for current conducting.

To keep the current from electroplating material off the firing chamber walls and the electrode holder, the electrical system is insulated from the firing chamber, which is at ground potential.

Figures 8, 8A:
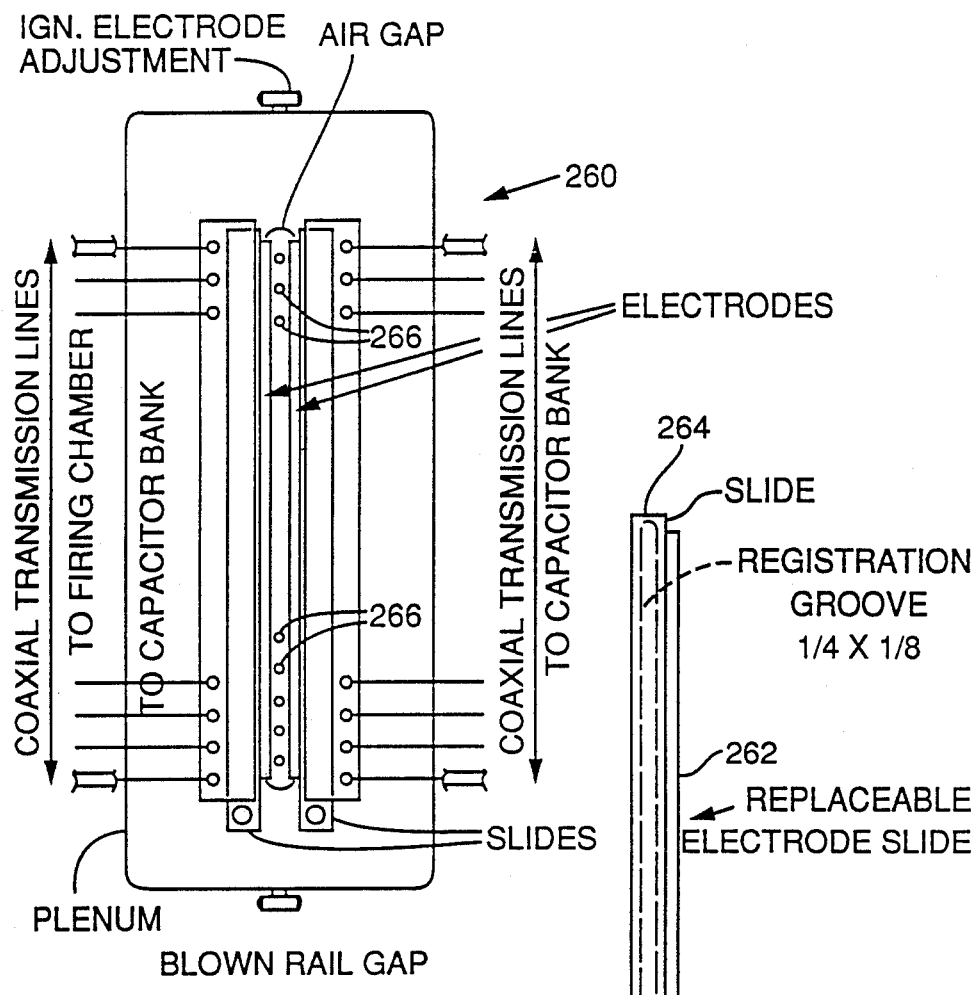
FIG. 8 is a top plan view of a form of blown rail gap switch which may be used in accordance with the invention.
FIG. 8A is a view showing a replacement electrode slide for the assembly of FIG. 8.

VIII. Rail Gap Construction (FIGS. 8–8D)

In order to make the electro-hydraulic principle useful for industrial processing, high discharge currents have to be switched repetitively from the energy storage bank, preferably a capacitive storage bank, into the firing chamber.

Although commercially available switches such as ignitrons, thyratrons or spark gaps could be used, the price and lifetime of these components is still not adequate at the present time to make them useful for the high-current, high repetition-rate duty required here. The system of the preferred embodiment of the invention, for example, may run at a repetition rate of 12/second, which is not too high for ignitrons or thyratron-firing, but the cumulative switched charge makes frequent replacement of tubes necessary, which is costly and results in much down time for the equipment.

In the case of the two million gallon/day larger processing system whose firing chamber was discussed previously, the switching conditions are even more severe—the best available thyratron would have to be replaced every few weeks and a whole bank of them would be needed, resulting in high circuit inductance in addition to the high cost, so that the processing system would be very difficult to use in an industrial environment.

Solid state devices are being continuously developed for higher currents and show great promise for the future, since they would never have to be replaced in ordinary service. However, at the present time only a bank of them could switch the discharge current required for an average size liquid processing system of the invention.

Accordingly, a discharge switch has been developed as a part of the present invention, that is based on the principle of easily replaceable electrodes. Plasma gaps are known as the highest current carrying devices constructed so far, but their physical arrangement required a lengthy replacement procedure in the past, when their electrode material was used up. That made them unsuitable for firing chamber operation as in the present invention.

The idea behind the new development is in the fact that no matter how the electrodes are arranged, a certain amount of electrode material is always lost at each firing. However, the amount lost per unit of charge conducted is directly dependent on the current density to which the switch electrodes are subjected and goes down rapidly if the same switch current is spread over a large surface area.

That principle has been used in the past in the construction of rail gaps and rotating-arc devices, both involving the concept that the electrodes should be kept as cool as possible during the discharge.

In the new design of the present invention, a rail gap has been constructed that has a large amount of electrode material built into it to begin with, and nearly all of that material can be burned off without disturbing the operation of the device. In addition, it uses heavy-metal electrodes that are not fixed and bolted to the transmission line, carrying the current, but are mounted on a contact slide that pulls out from the high current conducting block in a matter of seconds and enables a new electrode pair to be inserted. Both these features increase the usefulness of the device substantially, so that no technically skilled personnel are required for the servicing of the rail gap, and the down time for maintenance is very short.

Laminated springs provide a low-resistance contact, all along the length of the rail gap, assuring equal current density at each point of the rail.

A blower extinguishes the arc as soon as the current ceases to exist and restores the insulation feature of the device, ready for the bank to build up its charge again without keeping the switch conducting.

For a typical rail gap of this construction the operating voltage may be quite low, about ten kilovolts in the case of examples described herein.

To assure equal ignition of the entire plasma sheet all along the rails, a fast ignition generator has been provided, that uses 50 kilovolts (75 kv maximum) to ignite the rails that carry only ten kilovolts. The ignition arcs are current driven through drop off resistors from a fairly large storage-capacitor and a number of them are distributed all along the rails at about 1½ inch intervals. This ignition works regardless of whether there is power in the rails, making very low operating voltages possible.

This is a distinctive feature of the new rail switch, since normally rail gaps and spark channels have been ignited with an ignition voltage equal to or even ½ of the operating voltage.

In the case of the rail gap of the present invention, the ignition occurs in a time period so short that any variation of ignition timing from one part of the rail to another is negligible in comparison to the power-current rise across the rails. (At 40 kiloamperes, the maximum normally used discharge current in a system constructed as a prototype of the invention, the current reaches the 10 kiloampere point in 10 microseconds. At 85 kiloamperes (the maximum allowable discharge current), it reaches the same 10 kiloampere point in about three microseconds). The ignition current reaches its maximum in approximately 0.1 microsecond, so that a possible 10 percent variation of that would be quite inconsequential for the current distribution along the rails.

The importance of equal current distribution on the rails is of course that it provides the longest lifetime of the rail electrodes.

To further aid that principle, the current to and from the rails is carried by a number (e.g. 16) of coaxial lines, all equal in length and balanced in their conductance at the connecting points at capacitor bank and firing chamber.

Any increase in current through one line would result in a decrease of switched voltage in the rest of the rails (the resistance of the center conductors of the coaxial balances against the negative resistance of the arc) and therefore the system balances itself into a steady state, with the current density the same at every point along the rails.

The drawings of FIGS. 8 through 8D show the rail gap 260 assembly in accordance with the invention, in a construction which can be operated up to about 500 kiloamperes. The drawing shows the electrode arrangement, with the main or rail electrodes 262 easily replaceable by sliding operations.

As can be seen in the drawings, the design of the rail gap and the ignition circuit is quite simple. The value of this arrangement is in the ease of operation, the simplicity of the circuit and the fact that the heavy metal electrodes can be burned away completely before they must be replaced.

In the design built for the preferred embodiment of the present invention, i.e. the liquid processing system described, pure tungsten electrodes 262 are used, which are nickel plated for solderability. The switch electrodes 262 may be assembled from six pieces each, about three inches long soldered with lead-tin solder to the sides (left and right) so as not to distort the straightness of slides 264 and affixed rails 262 when the solder solidifies.

Ignition electrodes 266 (which may be 16 in number) are held by an insulating rod 268 (FIG. 8B) that is clamped on both ends against front and back plates (back plate 270 visible in FIG. 8B) of a plenum 272. As the electrodes 266 burn up, the holder 268 is pushed upward by adjustment as needed. About ½ year's operation can be had from one set of 16⅛ inch diameter tungsten ignition electrodes 266, each 12 inches long.

Ignition wires 274 make contact to the ignition electrode rods via contact springs located inside of hollow bolts 276, through which the electrodes 266 pass, so that these electrode rods 276 are slidable inside the bolts 266.

A blower 278 on the bottom of the plenum 272 applies an air stream 280 through the switch gap 282 that extinguishes the arc as soon as the current stops flowing, to provide quick restoration of the insulation of input and output side.

There is enough air supplied to move the entire arc one inch away from the rail electrodes 262 in less than a millisecond, during which time the voltage increase from the main power supply is only a few volts—not enough to jump the gap.

During ignition and during firing the continuous air flow moves the arc also, of course, but the discharge time is so short that during the entire discharge time period the arc moves only approximately 0.05 inch at the most. As explained earlier, the contact from and to the electrodes 262 is made by spring loaded laminations 284, between the slides 264 and slide holder structure 286, that provide very little contact resistance and a good tight fit of the slides 264 in their holders so they do not move, despite the vibrations of the blower motor, and of the entire liquid processor.

The burn products (tungsten oxide, etc.) are exhausted in the air stream, that is, channeled through a duct 288 away from the machine.

The ignition circuit (FIG. 8D) is self firing and does not require any electronic timing elements or trigger for its operation.

Power for the ignition generator may be supplied by a 75 watt 75 kilovolt DC power supply that is regulated down to 50 kilovolts. The capacitor C1 (FIG. 8D) is charged via R1 to about 40 kilovolts. At that voltage, the gap GP40 breaks over and charges the ignition electrodes 266 via the balancing resistor(s) R2. Since the ignition circuit inductance and capacitance is quite small (only about one microhenry and approximately 100 pf line capacitance is present), the voltage rise on the ignition electrodes 266 is fast, and they fire almost simultaneously, discharging C1. After C1 is empty, the circuit balances itself against the low-impedance power circuit through R3 and remains neutral. Then the gap GP40 cools off and C1 charges again for the next pulse. By adjusting the gap at GP40 and choosing a suitable drive voltage for the 50 (75 kv) power supply, the pulse repetition rate of the discharge, and therefore that of the firing chamber, can be selected.

Although the circuit is built to run at 40 kilovolt ignition voltage, it works well and fires smoothly and continuously from 15 kilovolts up.

This type of ignition circuit was chosen for the liquid processing system of the invention, because of its simplicity and its lack of semiconductors and low-level electronics, which have shown a tendency to fail in high-voltage type applications, especially where high discharge currents and therefore high levels of generated RF are present.

The slides 264 and the slide holder 286 shown in the drawing are manufactured from steel, nickel plated, and the coaxial cable 290 (FIGS. 8B, 8C) ground line connection rods 292 (FIG. 8B) are made from brass and insulated with Teflon (ultraviolet resistant).

The plenum is a fiberglass box, painted with UV-absorbing paint to prevent molecular damage.

The slides 264 can be refurbished with new electrodes indefinitely. Although tungsten is used in the preferred embodiment, other metals and metal alloys have shown to work quite well. Hastalloy (nickel alloys) works quite well as electrode material with somewhat reduced lifetime, but is much less costly. Ordinary stainless steel electrodes last quite well, and can be used for low cost and infrequent operation. Continuously run they last about one day, depending on the discharge current.

Figure 9:
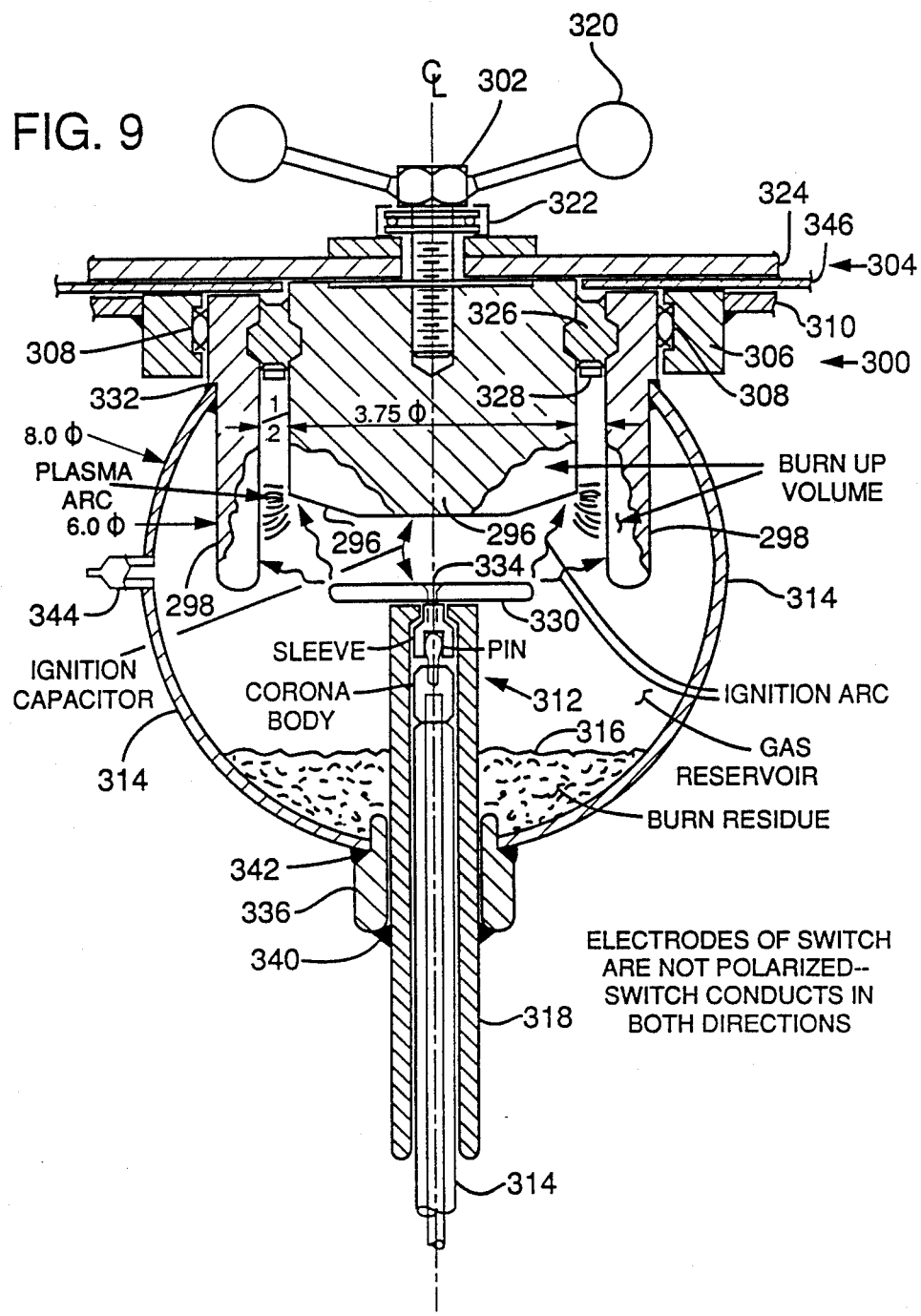
FIG. 9 is a sectional view illustrating another embodiment of a switch in accordance with the invention. The switch of FIG. 9 is coaxial and includes a number of features which produce a long service life.

IX. Coaxial Plasma Switch for Higher-Current Operation and for Self Interrupting Discharge Circuit (Specially Suited for High Flow Machines and Plasma Compression Chamber Operation) (FIG. 9)

The rail gap construction 260 above has an insertion and built-in self inductance of approximately 12 nanohenries. This is more than adequate with the operation of the small liquid processing system of the invention, and even in systems quite larger than that illustrated in the drawing. Also, several of these rail gaps can be used in parallel.

For the use of very-high current systems, especially the ones requiring fast risetimes such as necessary for theta pinch operation, the rail gap inductance is still somewhat high.

Therefore, another plasma switch of the invention has been developed that uses a coaxial design throughout, and its insertion loss into a parallel plate transmission line and its self-inductance is only about three nanohenries. This is shown in FIG. 9.

The electrodes 296 and 298 of this coaxial plasma switch 300 are very massive; about 10 pounds of the electrode material can be burned up before the electrodes have to be replaced, and the physical arrangement is such that, as in the case of the easily serviceable rail gap, no technically skilled personnel is required and the exchange of the electrodes can be done in approximately 15 seconds.

To exchange the burned up parts, all that is required for the embodiment shown is to loosen a contact bolt 302 on the transmission line (generally shown at 304) and drop down the old device. A new unit can be inserted in its place, pulled up against the transmission line contact with the bolt 302, making the contact to the center electrode 296. A contact ring 306 makes contact to the second, ring electrode 298, via spring contacts 308, completing the assembly and the operation can be restarted again. The contact ring 306 is in electrical contact with one flat plate conductor 310 of the transmission line 304. For better heat conduction away from the ring electrode 298 via the contact ring 306, the ring 306 can comprise a split design which is tightly pulled onto the ring electrode 298, with appropriate contact made to the plate 310 (not shown).

The drawing shows the switch 300 with its plug assembly 312 for the ignition cable 314, and a section of transmission line 304 carrying the switch connecting means.

The arc burns in a ring type fashion between the center electrode 296 and the outer ring electrode 298, spreading over the entire inner surface. Ignition occurs at a section in the center of the center electrode, using a fast discharge generator as described earlier; the ignition voltage is equal to or higher than the operation voltage of the plasma switch itself.

The electrode materials can be tungsten or copper-tungsten, if so desired for increased service intervals. However, the ease of replacement of this switch type makes it possible to use ordinary iron as electrode material. If it is run in an inert gas atmosphere, the lifetime is quite adequate.

At a certain current flow, this coaxial switch 300 shows a self-interrupting capability. The magnetic field in the space between the electrodes has a tendency to expand outwardly, and if it is strong enough, it blows out the arc by disconnecting it from the rim of the electrodes.

This feature can be used to shorten the tail end of the discharge pulse that normally would be slowly decaying. However, during that time no more electrohydraulic action is desired anyway. The shock front has already been generated and has expanded through the liquid and the radiation is no longer necessary.

If the current flow could be interrupted at this point, that remaining energy can be saved in the capacitor bank for the next pulse.

This type of pulse shortening cannot be accomplished by using a rail gap, since the rail gap stays conducting until there is no more current to support the arc. The coaxial switch interrupts itself, if run in the correct operating region. Therefore, no blower need be used, and the switch case can be either filled with inert gas required for its operation (using iron electrodes) and then hermetically sealed off; or it can be connected to an external gas supply to keep it pressurized. By adjusting the gas pressure, the switch insulation resistance can be selected.

There is a further operation mode possible. By setting the gas pressure at a certain value, either at a permanently sealed switch or an externally regulated one, the switch can be self-igniting at a certain operating voltage. Connected to a capacitor bank and to the firing chamber, automatic operation is possible, eliminating the need for the ignition generator altogether.

When the bank voltage has reached its desired value, the switch breaks down, firing the process chamber. At the point of highest current the switch interrupts and the bank starts charging up again from the power supply. This type of operation results in less flexibility in the operation of a general purpose system such as the liquid processing system described, but can be used in the construction of a dedicated system that is laid out for specific operation, such as for a fixed-site sewage treatment plant or mineral recovery plant. Such a system can substantially reduce the amount of energy used, and such systems are also less costly to build.

It is estimated that about 20 to 30 percent of the energy supplied to the firing chamber is not useful but wasted during the current decay, and for a large scale operation the cost savings in energy can be substantial—with the self interruption switch-operation described herein.

Presently there is no other device available that can act as a repetitive fast interrupter for currents in the range between about 300 kiloamperes and one megaampere. Experimentation has been done with photoelectric devices in the high current region, but no useful and inexpensive switch has yet been constructed, particularly as would be suitable for use with the present invention.

The switch case 314, as shown in the drawing, is built as a spherical container large enough to hold a substantial amount of gas and also large enough to accommodate the quantity of residue 316 generated by electrode burnup.

Several of these switches have been built with different electrode materials using tungsten, copper, iron and thoriated tungsten. A process station has been constructed that provides the means to assemble these devices, clean them under vacuum conditions and fill the switch cases with purified gases before the cavity is sealed.

The switch 300 shown in the drawing is an example of the remotely triggered coaxial type having very low self-inductance. This type has been built with a switch case diameter of 8 inches and a ring electrode (298) diameter of 6 inches. The switch shown in the drawing is of the permanently sealed type.

The illustrated switch 300 can be exchanged for a replacement switch in a few moments by pulling the ignition cable 314 out of the bushing 318 and loosening the bolt 302 at the top; this is done by turning the attached handle 320.

A ball bearing 322 aids in achieving a good contact between the upper plate conductor 324 of the transmission line and the center switch electrode 296. The other electrode 298 has a sliding contact arrangement with the contact ring 306 and the band of contact making springs 308, as shown and as briefly described above.

In the discharge circuit, the center electrode 296 is the anode and the surrounding electrode 298 is the cathode. The reason for this is that the anode becomes hotter and is cooled by contact with the transmission line plate 324, which in turn can be cooled by air flow against it. The cathode is cooled through the switch case 314, which conducts the heat away and can be forced-air cooled also. For a 30 pulse/second (pps), 200 kiloamperes operation of 4 kilojoules, the heat loss is a few hundred watts, so that simple air cooling is quite adequate.

The switch shorts the transmission-line conductors 310 and 324 to each other when fired.

An epoxy seal 326 is protected from the UV generated by the arc by a ceramic ring 328, but it has been discovered that a mixture of epoxy and alumina powder works as well for the construction of the seal 326, eliminating the need for the ceramic ring 328.

As described earlier, the switch can blow out its own arc, if the magnetic field between the center electrode 296 and the ring electrode 296 is strong enough, causing self-interruption. The field drives the arc downwardly until it is put far enough away from the electrodes that it is extinguished.

Ignition is accomplished by rapidly charging an ignition electrode 330 with high voltage, with the space between the electrodes 330 and 296 acting as a capacitor. When the ignition arc breaks over, this capacitor discharges, giving a strong ignition current, whose rise time is quite fast. This causes an RF pulse that ionizes the gap between the elements 330, 296 and 298 and the power arc jumps over and the switch starts conducting.

As shown in the drawing, much of the electrode material can be burned away and the switch will still operate, because the gap distance remains the same.

A good safe ignition voltage for this operation is about 100 to 150 kilovolts.

The burn residue 316 falls to the lower part of the spherical switch case, where it accumulates as shown in the drawing.

Switches such as shown in the drawing are easily manufactured and refurbished. A solder seal at 332 can be melted as often as desired, and a new electrode pair can be soldered in.

The ignition electrode 330 can be exchanged by unscrewing a small flathead screw 334 in the center of the assembly, but the ignition electrode outlasts many power electrode changes.

The ignition cable 314 may be a stripped coaxial cable of the type RG220-U or similar.

The illustrated switch is held in place by the bolt 302 only, on the transmission line assembly 304.

If it is desired to have greater cooling through the transmission line contact, as stated above the ring 306 can be split and clamped tight against the ring electrode 298, giving good thermal contact at this location.

In this particular switch, the electrodes are made of regular construction steel tubing, and the ignition electrode 330 from SS304.

The switch case 314 is a thin wall stainless steel sphere, nickel plated for solderability. A bushing body 336 at the bottom of the sphere is brass and bushing insulator 318 is polycarbonate which is resistant to UV radiation.

Epoxy is used at 340 as well as at 326. The connections at 332 and 342 are soft solder joints.

Shown at 344 is a copper tube, pinched off after gas fill.

The transmission line 304 can be constructed of plated steel or aluminum; it is desirable to use heavy material, since during the discharge the electromagnetic forces have a tendency to separate the two conductors. A dielectric at 346 in the transmission line is polycarbonate sheet; in the case of a 20 kilovolt firing chamber operation, $\frac{1}{8}$ inch material is used.

This type of coaxial switch can switch 500 kiloamperes at 30 pulses/second with the switch used alone; but it is better to use a number of the switches in parallel, since the switches ganged in parallel will produce an increase in the lifetime of the switches that is significantly greater than a succession of single switches used alone. In other words, additional switch lifetime can be realized by spreading the switched charge out among a number of separate switches, at each firing. The reduced stress on each switch increases its lifetime in a manner approximating an exponential function.

Dimensions are shown (in inches) in some of the drawings discussed above; these dimensions should be understood as examples only, for the exemplary process throughput rates discussed in connection with some of the figures, and to show relative sizes, radii of curvature, etc. of various components. The dimensions are not to be taken as limiting the invention to any particular size. Also, the terms "up," "down," "above," "below," etc. are intended only as references for understanding the subject matter of the drawings, and not as limiting with respect to circulation of system assemblies or components of the invention, since nearly all components can be in different orientations from what is shown.

It is important to the electro-hydraulic principle that the firings or discharges be conducted in a substantially confined volume. By "substantially confined volume" is meant a volume that can be open-ended, but which has ends with narrow restrictions or conduits or sharp changes in flow direction, such that the inertia of the liquid tends substantially to contain the shock wave and the pressure associated with it. FIGS. 3 and 6 show generally examples of such inertial confinement arrangements.

EXAMPLES OF LIQUID PROCESSING PERFORMED USING THE DESCRIBED METHOD AND APPARATUS

Using the electro-hydraulic principles as described above, and using essentially the apparatus illustrated in FIGS. 2, 3, 3A–3E, 4 and 4A, a series of tests have been conducted for the separation of dissolved solids from liquids or in some cases, for separating liquids from other liquids. The processes of separating different types of substances from each other by a high energy pulse to create a shock wave through the liquid to induce chemical reactions and to effect separation is an important aspect of the present invention.

In general terms, an electro-hydraulic system can be constructed according to the following breakdown of components/subcomponents and operating-principles:

The energy stored can be a capacitive, inductive, electro-chemical (for example, a rotating electrical machine) or piezo electric system.

In order to cause an even flow of energy (electricity) into the system these energy stores are being charged on a continuous basis from the power-source (main-line). The energy has to be coupled into the liquid volume by a transfer mechanism during the discharge time. In the case of the machines built, this was done by a pair of electrodes or a single electrode with the liquid surface representing the second electrode. Transducer driven systems are possible, so is the generation of a high pressure zone by the means of a laser generated plasma. The process chamber has to be strong enough to retain the liquid and absorb the continuous mechanical stress generated by the shock waves hitting the chamber walls.

The pressure waves can be either generated inside the firing chamber directly, in the liquid, which allows for a simpler construction of the machine or can be externally generated and coupled into the liquid through the firing chamber wall. This requires a more complex system, but results in a better control of the energy used, and makes an even energy density-distribution within the process-volume possible. If the firing chamber is set up in a resonating mode, the energy of the reflected pressure waves can be utilized beneficially, and less energy is wasted.

Multiple internal electrodes are also possible, requiring a more complex power supply and a discharge system, but also allowing a more uniform energy distribution than a single electrode pair arrangement.

The electro-hydraulic principle is basically a very efficient method for coupling high energy levels into a (liquid) volume. With ordinary electrical technology, power levels can be achieved that momentarily ionize liquids (and substances dissolved in the liquids) for the purpose of inducing chemical reactions.

Efficient use of the electro-hydraulic process requires continued throughput over an appreciable period of time (e.g. a day or at least several hours). This requires repeated, relatively rapid discharges (or firings) in the firing chamber. Such firings should be at least several per minute and preferably more than one per second. In fact, a frequency of 30 firings per second has been achieved and it is projected that at least 600/sec. second can be achieved.

In copending application Ser. No. 78,655, a machine is described that is capable of processing liquids at a rate of about 50,000 gallons per day at an energy level of 0.135 kilojoules per cubic inch.

In principle, the electro-hydraulic system employs an energy store (electrical energy stored in a capacitor bank, inductive energy store, electro-mechanical, piezoelectric, etc.) that is charged over a time period determined by the power level desired and the flow rate of the liquid to be processed. At a certain instant in time, the energy stored is discharged into the (liquid) volume and the high power concentration causes a small volume of the liquid to be turned into a plasma. Depending on the energy transfer mechanism used, this plasma region is locally confined by the inertia of the liquid around it in a small space.

The discharges have to be fast enough to cause a high pressure buildup at first, within the plasma region; as the plasma region expands, and compresses the liquid surrounding it, a steep shock front is generated and travels through the liquid until it reaches the wall of the process vessel.

If the process vessel is the size of a few inches in diameter, then the discharges have to be on the order of a few microseconds to get good operating efficiency.

A prototype machine, used in processing liquids according to the following examples, had various process vessels (firing chambers) inserted in it and there diameters ranged from about 1 inch to about 3½ inches; the volumes were cylindrical, with the height being approximately equal to the diameter. The discharge times of the (maximum 2 kilojoules) capacitive energy store ranged from 5 microseconds to 60 microseconds, and good results were obtained in processing various liquids in order to achieve energy efficient chemical processing.

It is believed that this method of supplying ionization energy into a liquid is preferable to heating the liquid thermally, since very little energy is wasted in a properly tuned firing chamber. The traveling shock wave represents a high temperature zone traversing the liquid; after its passage, the liquid is thermally "cold" again and overall, the thermal energy supplied only raises the liquid volume's temperature by a few degrees centigrade. Therefore, this process is thought to be much more economical for many process applications than the use of reactions in the plasma arc directly; only if a few percent of thermal energy is needed, compared to those systems.

Experimental results show clearly that a certain chemical reaction runs according to the energy supplied into the process volume, and an excess of energy does not contribute any further to the reaction.

In the machine built and tested in accordance with the invention, the capacitive energy store was discharged at a rate of between about one and thirty pulses per second (pps), and a flow rate of up to 40 gallons per minute was supplied through the firing chamber.

No valves are needed in accordance with the system of the invention, since the continuous flow can be timed precisely with the firing rate of the machine and thus every liquid volume passing through is exposed at least one time.

The energy was supplied via a pair of electrodes extending into the liquid and both a coaxial and an opposed-electrode arrangement were used.

A definite energy-saturation point could be found in some of the experiments.

When a plasma discharge is generated in a closed volume such as described, almost all of the energy supplied is used to ionize the liquid (and its constituents). The high temperature of the initial discharge generates electro-magnetic radiation in the form of light in the infrared/visible and UV regions of the spectrum, and as described earlier and in copending application Ser. No. 78,655, even far-ultraviolet radiation can be supplied using plasma compression.

The mechanical energy of the pressure wave going through the liquid resembles itself a high temperature, and the combined effect of shockwave and radiation turns any molecular substance momentarily into the monatomic state. The radiation transfers the liquid by absorption/emission, and eventually decays toward the longer wavelength.

Approximately one-half the energy goes into radiation, and about 30 percent to 40 percent goes into the thermal heat of the plasma, which is turned into the mechanical energy of the pressure front as the plasma expands.

The experiments done so far have always been done with a discharge time chosen so that the electro-magnetic radiation was present during the entire time the shock wave traveled through the liquid. It was thought that in this way, the maximum ionization efficiency would be achieved.

Based on the experience gained with various process fluids, the following new features are advantageously incorporated in a machine of commercial size and capacity, representing further embodiments over what is shown and described above. The commercial machines employ a simplified power supply, in which a capacitive energy store is charged via a transformer that is both voltage-regulating and current-limiting. A more convenient means of changing the impedance of the power supply (than changing the capacitors of the bank) to accommodate a wider variety of liquids having different electrical resistances is also employed. See FIG. 10.

X. Impedance-matching of Discharge System (FIG. 10)

Figure 10:
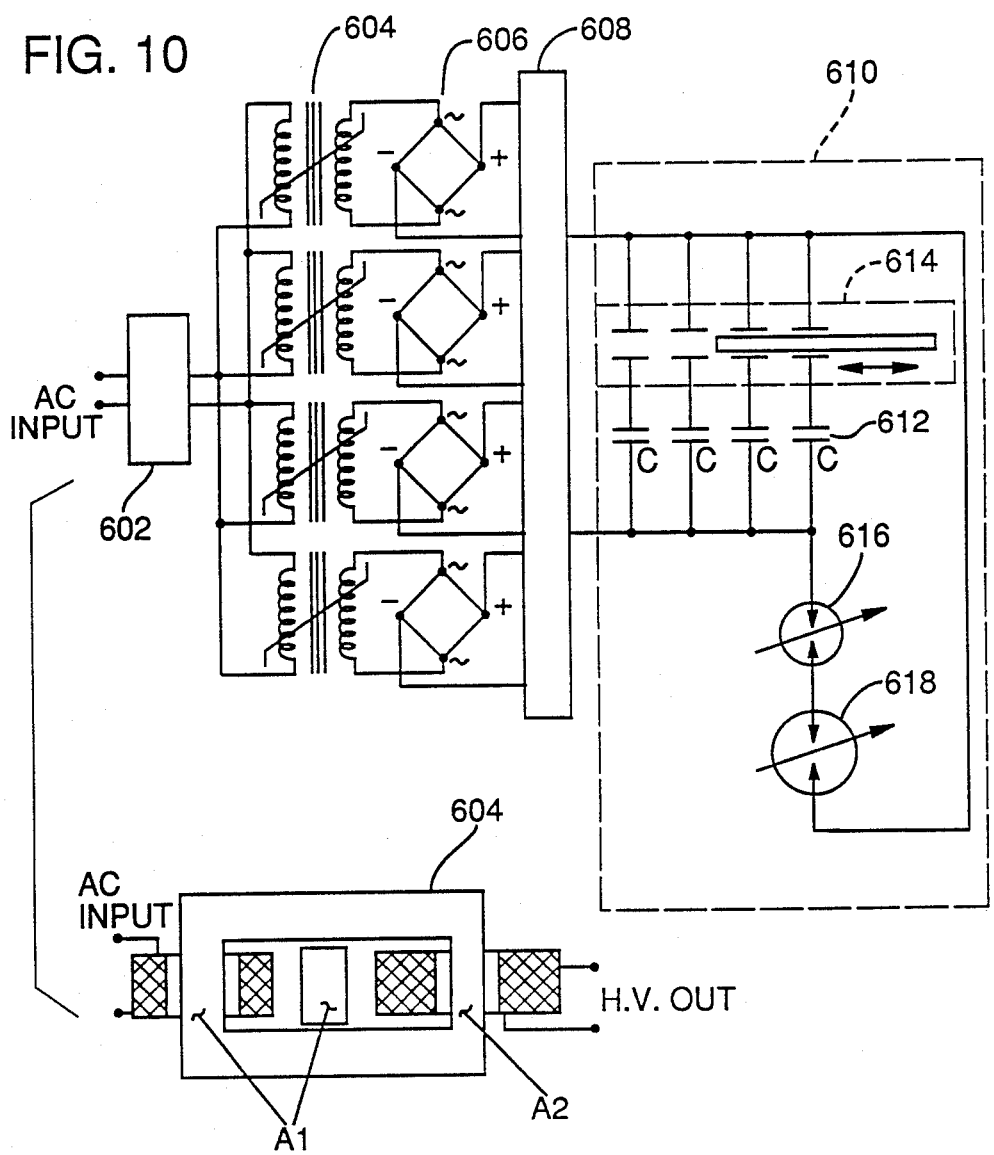
FIG. 10 is a schematic diagram showing an electro-hydraulic system whose impedance can be adjusted according to the conductivity of the process liquid.

FIG. 10 shows a discharge system that can be adjusted according to the impedance required by the process liquid.

The capacitors C are charged over a transformer—rectifier system that is designed for constant power output but variable voltage.

The transformers 604 employ a voltage limiting feature by using different iron cross sections A1 versus A2 that result in magnetic saturation of the iron core cross section A2 if the input or output voltage increases too high. This protects the capacitor banks C from over voltages due to possible resonance conditions or line voltage fluctuations.

A2 is approximately 75% of A1.

The magnetic bypass decouples the secondary leg during high current conditions—being it resonance or short circuit currents into the bank. (Initial charging at every cycle.)

The current limiting feature also reduces the size of the secondary coil due to a reduction of the necessary wire size.

The high voltage transformers can charge the capacitor bank either over rectifiers (half-wave or bridge rectifiers 606 as shown); or can be connected directly without the use of rectifiers for a maximum discharge rate of twice the line frequency.

Series/Parallel switching (switch 608) of the transformer rectifier units is done at the relatively low current level of the charging current.

Various capacitances (C) 612 are connected to the low impedance discharge line by means of a multiple contact sliding switch 614 having a very low resistance and inductance.

The discharge path is completed through the variable gap 616 and the firing chamber 618.

Electrode distances in both gap and firing chamber are adjustable. The entire discharge current path 610 can be held down to a self-inductance range between 100 nH to 1 uH. This is necessary for the fast rise times required for the generation of a steep shock front in the process fluid.

For an electrode gap in the firing chamber of 1/4" to 3/8" the voltage is selected between 5 and 20 kV.

At a firing chamber bore of 1" the required capacitance for all of the applications described is between 3 and 20 uF.

Series/Parallel switching of the capacitors individually and directly connected to their own power supplies has been tried but proven not very successful due to the complexity and cost of the high current/low inductance switching network required.

For a certain power setting and the corresponding firing rate the variable gap 616 is set to break over at the selected voltage, discharging the stored energy into the firing chamber 618.

The electrode gap in 618 is chosen according to the fluid processed and the voltage selected. It is set to achieve a critically dampened discharge curve of the current; the load impedance increases with increased gap lengths of the firing chamber electrodes.

If a faster rise time is required, discharge current overswing of 20% to 40% can be tolerated but at long and continuous operation that way the lifetime of the capacitors is then somewhat comprised.

It has been observed that a certain amount of energy is lost at the beginning of each discharge, due to the heat required to build up a steam blanket around the discharge points of the electrodes. Also, depending on the electrical resistance of the liquid, during the discharge a certain amount of the current bypasses the arc and does not contribute to the plasma heatup.

Therefore, the voltage and capacitance (energy) requirements vary greatly, and in the case of a very pure (nonconductive) liquid, the voltage between the electrodes has to be high enough to break through the liquid layer, while the same high voltage supplied to a highly conductive liquid would cause a large bypass current in the firing chamber, wasting a good portion of the energy supplied during the discharge time. Therefore, impedance matching of the high voltage power supply (HVPS) and the reaction chamber is necessary for a successful industrial application wherein the costs of the energy must be taken into account.

In most reactions the amount of gas generated is small, and therefore a simplified shock absorber has been constructed which does not use a volume of air or gas for cushioning, and does not require a constant gas supply as in the embodiments described above. The modified shock absorber relies on scattering of the shock waves in a converging space, and attenuation factors of approximately 10:1 have been obtained, making it possible to use regular high-pressure hose to connect the liquid handling system to the firing chamber. See FIG. 11.

XI. Construction of Self-contained Shock Absorber (FIG. 11)

Figure 11:
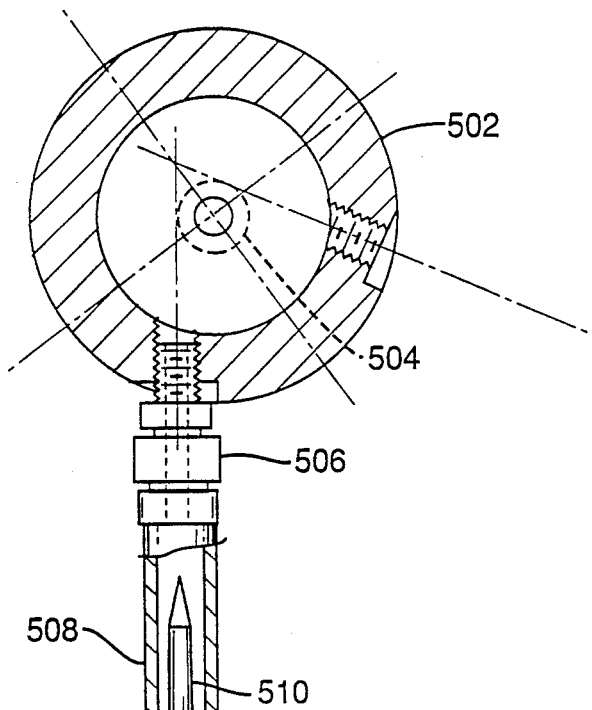
FIG. 11 shows a firing chamber and shock absorber that does not require a gas supply for its operation.
Figure 11:
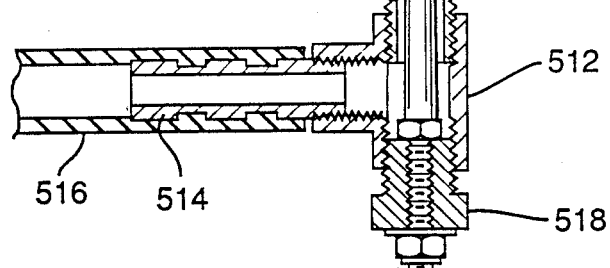

FIG. 11 shows the firing chamber and shock absorber arrangement as it was used for the water decontamination test described in Example VII, below.

The firing chamber body 502 built, was 2½" high and had an inside diameter of 3½". 504 is the (opposed) electrode arrangement mounted on steel disks insulated by nylon disks (not shown) from the chamber body.

The liquid flow processed through the firing chamber is in a lateral direction. Shown in the drawing is one shock absorber assembly: the other one is indicated by its centerline only. O-Ring backed up unions 506 connect the shock absorber tubes 508 to the firing chamber body. A part of the shock wave generated by the discharge travels down through the union into the cylindrical tube 508 and is attenduated by the converging space between tube 508 and the conical body 510.

A pipe tee (1") 512 holds the plug 518 on which the attenuator is mounted. The mounting threads are preloaded with the nut in the direction of the shock force experienced by the attenuator body. A high pressure steam hose 516 (2¼" OD×1" ID) connects directly to the tee via the 3" long tube 514.

The tube has two shallow grooves turned into the outside wall to prevent hose slippage. Two clamps (not shown) secure the hose to the tube.

This arrangement works very well and in a materials test withstood continuous firing at full power (2 kilojoules) at a rate of 12 pulses per second without showing excessive vibration of the hose and did not result in the loosening of the union 506.

Inlet and outlet shock absorbers are identical.

To allow for better flushing of the firing chamber, the flow axis are offset from the geometrical center as shown and angled at 68° to clear the edges of the electro-hydraulic frame the entire assembly is mounted in.

The arrangement has been built for a shock front travelling distance of approximately 1½" and a discharge time of 10 usec. (time from ignition to first zero crossing of the discharge current)

The experimental work was undertaken to establish uses for the electro-hydraulic process in the following areas:

Mineral recovery
Toxic waste breakdown
Sewage treatment
Fresh water decontamination
Demineralizing of drinking water
Demineralizing of industrial water
Destruction of bacterialogical contaminants
Decontamination of contaminated soil
Processing of agricultural waste and byproducts
Breakdown of heavy hydrocarbons (cracking)
Synthesizing of hydrocarbons from basic elements or waste products
Catalytic formation of new compounds
Research in high energy molecular structure
Materials testing salt water (seawater) decontamination
Reactive oxidation of hydrocarbons and of hydrocarbons dissolved in water.

The processing of hydrocarbons using the electrohydraulic principles and method as described is an important aspect of the invention. The processing of hydrocarbons can be put into four categories.

The first category involves conversion of hydrocarbons themselves, essentially with no water present. If hydrocarbons are fired directly using the electrohydraulic machine, a single hydrocarbon will breakdown into a gaseous compound, into a liquid compound and/or into solid compound. Those compounds can then be separated out by themselves into groups of hydrocarbons having approximately the same molecular weight, by conventional means. The unwanted hydrocarbon compounds can then by turned back into the firing chamber for further processing. This reprocessing cycle could replace catalytic converters presently used in oil refineries. Using this method, basically any hydrocarbon can be turned into any other hydrocarbon by the electro-hydraulic firing and/or by the addition of either heavier or lighter hydrocarbons or simply carbon and water. In any case, all the elements must be present to produce the desired hydrocarbon compounds.

In another category, hydrocarbons can be synthesized by the electro-hydraulic process of the invention. Starting with water, carbon and hydrogen and possibly chlorine, a mixture can be fired electro-hydraulically to synthesize certain hydrocarbons. Additional hydrogen can be added in the form of methane. By the electro-hydraulic process, these elements combine to form a variety of hydrocarbons that can be separated by distillation (in liquid), and unwanted products formed in the reaction can be recycled through the firing chamber.

In a further category of hydrocarbon processing, a hydrocarbon mixed with water can be fired electro-hydraulically. In such a reaction, some of the liquid hydrocarbons are converted into gaseous compounds to be vented from the chamber. The remaining liquids might comprise lighter hydrocarbons as well as heavier hydrocarbons than the original input hydrocarbons. In the case of solid hydrocarbons mixed with water, again these will convert into a variety of gaseous hydrocarbons, and lighter liquid hydrocarbons can be used for further processing.

Electro-hydraulic processing can also be used for the processing of hydrocarbons dissolved in water with the addition of oxygen. Oxygen can be supplied either in gaseous form by dissolving oxygen directly into the water, or by mixing into the water an oxidizing agent such as hydrogenperoxide. In either event, an excess of oxygen is present, that will turn into monatomic oxygen under the addition of energy supplied by the electro-hydraulic process. Under conditions of ionization of the hydrocarbons and oxygen, the hydrocarbons will react with the oxygen and will burn reactively into a mixture of carbon dioxide, carbon monoxide, and water, therefore being easily removed from the water. The uses for this process include removal of harmful hydrocarbons from water (e.g. water contaminated by pesticides, PCB transformer oils, gasoline, etc.).

A further category of electro-hydraulic processing in accordance with the invention, not necessarily involving hydrocarbons, is in the processing of water containing waste products such as municipal sewage, manure or agricultural waste. In the case of municipal sewage, processed directly without addition of any further chemicals, the sewage can be run through the electro-hydraulic process to result in a biologically inert product free of live bacteria. Some of the minerals which were present in the water might precipitate out, leaving water, after settling of the solid compounds, that can be discharged without causing environmental harm.

In the case of manure and water, which is a major agricultural problem, a mixture simply comprising manure and water can be electro-hydraulically processed and turned into an industrial product usable as raw material for generating feed supplement or fertilizer. By addition of hydrated lime to a mixture of manure and water following certain steps, the bacteriologically harmful portions can be turned into a fuel supplement for coal burning power plants, or it can be used as a fertilizer which would neutralize some of the acid that sometimes contaminates soils.

As a further processing category, the electro-hydraulic process can be used on water contaminated with minerals and heavy metals. Solutions containing toxic wastes can be subjected to the electro-hydraulic processing either directly or after addition of a neutralizing agent. The minerals are precipitated out by the electro-hydraulic process, and the remaining water after separation from the solid compounds is essentially of drinking water quality. If ordinary salt water, such as sea water, is processed without the addition of any other chemicals, then a distinctive drop in salinity of the water is observed.

The following examples show efficient separation of substances present in liquids using the electro-hydraulic process as described. These examples illustrate efficacious results for a number of different types of substances separated from liquid carriers.

EXAMPLE I

Processing of Agricultural Waste Products Such as Manure, Partially Dissolved in Water Into Usable Raw Materials After extensive experimentation with different types of manure slurries and using different processing methods, the following system of processing manure mixed 1:10 with water and partially dissolved in it, was established as a possible industrial process.

This was done by closely controlling the particle sizes of the solids in a number of successive steps and using an electrohydraulic process for both particle size conversion and for chemical conversion.

The described method was developed to be concurrent with available industrial equipment and according to various manufacturers' specifications and guidelines.

The equipment selected and available was of a size that could be used to build a demonstration plant with a throughput of one million gal./day.

The described processing method was done as a bench type experiment, testing each step. Analytical control tests were done by an independent laboratory for each part of the process to verify their performance.

Cow manure (moist, with an estimated water content of 50%) was mixed with water in a 1:10 ratio.
Weight of manure: 760 grams.
Total weight of slurry made: 4180 grams.

To control the particle size the slurry was filtered, resulting in the following particle sizes:
largest: 20 to 50 microns.
highest count: approx. 5 microns.
smallest: approximately 1 micron.

One liter filtrate was made.

The filtrate was mixed with 25 grams (2.5%) of hydrated lime, type S, and allowed to settle.

After a settling time of 7.5 hours, the liquid content was removed and a small amount of it was drained through the following filters:
A. A coarse filter, of an approximate pore size of 50–70 microns, leaving no residue; the liquid runs through in a steady stream by gravity.
B. A fine filter with a pore size: 11 microns; the liquid drops through by gravity and leaves no traces of residue; does not clog the filter and the flow does not slow down.

The watery part of the mixture at a settling time of ½ hour was fired in the electro-hydraulic processor at an energy density of 1 Kj/200 ml.

As a result of this, precipitation of some dissolved substances was observed, showing up as particles in the liquid and turning it from a partially translucent state into a more cloudy substance.

½% of lime S was added and mixed with the liquid.

The precipitated substances started flocking out approx. 5 min. and gravimetrically the liquid cleared to a total transparent state after 8 to 12 hours; a settling of the larger particles was completed after one hour, with minerals and lime settling on the bottom first.

The liquid content was removed and used for final chemical analysis. Approx. 95% of the liquid content of the original mixture was recovered by this gravimetric clearing method.

The above described tests and procedure were repeated twice.

The following analysis was done to determine the usability of this process for industrial purposes:

Coliform test on a mixture of manure and water, unprocessed, 1:10.

Coliform test on a mixture of manure and water, 1:10, cleared with lime, watery part.

Coliform test on a filtered mixture of manure and water, 10:1, cleared with lime, water part.

Coliform test on a filtered, fired mixture of manure and water, with a particle size of ∼1 micron.

Coliform and Bio-Oxygen demand on a cleared, fired and 20:1 diluted mixture.

Coliform, Bio-Oxygen demand, Ammonia, Nitrate, Nitrite, Kjeldahl Nitrogen, Organic Nitrogen and pH level on the cleared and fired mixture.

Bio-Oxygen demand on a pH adjusted, fired and cleared mixture.

TESTS RESULTS AND CONCLUSION

A manure slurry of high water content, originally rich in bacteria and biologically toxic, was processed A. Into an organic substance having a water content of approx. 50%

B. Into clear water that is free of bacteria, does not support new bacterial growth, containing ammonia and nitrogen.

C. Into a substance of approx. 1-part organic matter and 1-part lime as solid components and having a water content of 50 to 75%.

The industrial process would yield the following substances, processed from a manure slurry, diluted 1:10 with water.

The solid organic matter can be recovered in its unprocessed form between 96 and 98% by weight, with a water content of approx. 50%; the particle size of that solid can be selected but has to be above 40 microns, for further industrial processing.

The liquid can be cleared to a degree of total optical transparency, having no odor or bacterial growth, but showing a light yellowish tint. The liquid contains organic nitrogen and ammonia and could be used in agriculture or industry, or could be discharged as is.

A small volume of a mixture of organic matter and Lime, approx. 2 to 4% of the organic matter input, containing between 50 and 70% water, being organically inert, that after drying could be used as fuel additive in the firing of boilers, or as an agricultural product.

EXAMPLE II

Municipal Sewage

Precipitation tests were run using biological waste in the form of municipal sewage taken from the municipal sewage plant in Sunnyvale, Calif. in the Fall of 1987. Essentially decanted liquid was used, containing dissolved contaminants as well as finely suspended particles of very small particle size (smaller than one micron). Crushed limestone (finely powdered), gypsumpowder and hydrated lime were separately used as three different flocking agents, in three comparative tests.

Hydrated lime worked best of the group limestone, gypsum and hydrated lime. Gypsum performed somewhat better than powered limestone.

This experiment was conducted on a batch processing basis—approximately 70 ml per firing. The energy concentration was between 30 and 150 joules per cubic inch. Coliform tests were performed both before and after firing, and a control test was performed to prove that the testing procedures did not crosscontaminate each other.

The results can be summarized by stating that the bacteria count of the unfired sewage, $1\frac{1}{2}$ to 2 million bacteria/100 cc, could be dropped to a range of 2000 to less than 2 per 100 cc, depending on the energy expended in the discharges.

This is a very beneficial result, showing competitiveness with conventional sewage treatment in cost and in degree of purification, in a system of far less capital cost.

EXAMPLE III

Seawater/Oil Separation

Experiments were carried out with regard to separation of oil from sea water as relates to cleaning up contaminated beaches and collecting oil from the surface of the ocean.

A mixture of sea water and light mineral oil mixed in the approximate ratio of between 10,000:1 and 100,000:1 was introduced in the presence of a small amount of sand consisting mainly of $CaCo_3$ and $SiO_2$ with a controlled particle size (between approx. 50 and 500 microns) and held in suspension in the liquid (the sand remained in suspension until firing).

When fired electro-hydraulically, the following phenomena were observed:

(1) Some of the oil was converted to a mixture of gases that after possibly reacting with gases that might have been generated by the firing of the sea water itself, were vented from the firing chamber.

(2) Some of the oil droplets were converted to dark tarry particles that formed larger particles with some of the sand, by adhesion with the sand.

(3) Some of the oil seemed not to have been converted chemically but was broken down into microscopic droplets that also showed a coherence to the sand particles. The main volume of the oil falls into this category.

After processing the water cleared free of detectable amounts of oil, which settled out together with the sand (carrier substance).

It was also observed that in order to make efficient collection of the oil possible, the sand particles must have a certain size—too large particles work inefficiently and too small particles collect too much oil per particle or particle cluster, and therefore have a buoyancy that is too high. That would make centrifugal separation impossible.

Since for the electro-hydraulic breakup of large oil drops into very small ones only the mechanical action of the process is used and no chemical conversion is required, the amount of power is considerably lower for this mode of operation. The tests were done with 25% power input (about 30 joules/cu.in.) into the equipment which would translate into 100 to 150 kw power input into a 2 million gal/day processing module.

For a commercial process such as in ocean water cleanups the following procedures would be required and would have to be translated into dedicated pieces of equipment:
(1) Collecting contaminated water from ocean surface.
(2) Primary cleaning of incoming sea water/oil mixture through a coarse (sand/gravel) filter to separate large, floating tar particles.
(3) Mixing of the oily water with a controlled amount of carrier substance (sand).
(4) Firing mixture electro-hydraulically.
(5) Separating mixture by centrifuging and discharging water to the ocean surface or discharging the mixture directly to the ocean floor where it would settle, without prior centrifuging.

It is very likely that in the case of beach cleanups, etc. the required carrier material could be manufactured on site (on the barge) from materials that could be vacuumed up from the ocean floor.

If sand is brought up with water then by using a two stage centrifugal process, the medium range particles required for the process could be separated out while too large and too small particles could be rejected in the first and second stage centrifuge respectively.

All required equipment for this process is readily available from the industry.

EXAMPLE IV

Processing of Hydrocarbons Dissolved in Water

Tests were conducted on a mixture of isopropyl alcohol, acetone and tetrachlorethylene (in a 1:1:1 ratio) dissolved in water at a ratio of one part hydrocarbons to 1000 parts water. The tests revealed that hydrocarbons dissolved at a low concentration in water can be reactively burned by dissolving oxygen in the solution and then supplying activation energy to initiate the reaction.

The oxygen introduced to the water by adding hydrogen peroxide as an oxidizing agent, at a ratio of approximately 1:1 hydrogen peroxide to hydrocarbons by weight.

Previous research has used ultrasonic fields for energy input, generated by conventional means.

The tests were conducted on a laboratory scale and yielded positive results, indicating that a certain amount of hydrocarbons reacted with the oxygen, possibly in the form of ozone or monatomic oxygen. It was observed that gas pressure existed in the chamber, and the gas was vented when channels were opened to permit the gas to escape. The gases comprised hydrocarbon products which were reactively burned off in the chamber, forming gases which were vented.

The test results indicate an efficient method for processing water contaminated by substances such as solvents, PCBs, etc. in large quantities, with a moderate energy input.

EXAMPLE V

Mineral Recovery from Geothermal Brine (E. G. Gold)

Tests were conducted on geothermal brine taken from a geothermal site near Green River, Utah. Using the process of the invention, the applicant successfully precipitated a mineral rich substance from the geothermal water that is found at this site. As in Example III, 25% power input was used.

An average gold content of 13.65 ppm was recovered from the watery mineral sludge precipitated by the equipment and method of the invention, as described above.

Taking recovery efficiency and operation costs of the machine into account, this figure translates to a recoverable value of approximately 0.5 cent of gold per gallon of brine water.

Other testing and known data indicate that this recovery represents about 75% of the total gold contained in the brine from the subject site.

Additional analyses have been performed that indicate a possible platinum content of between 15 and 140 ppm in the mineral precipitate of the process. This figure was obtained by averaging several separate assays done by generally accepted methods. Measurement inaccuracies come into play because of the small weight of samples tested, on the order of 0.5 to 50 grams. The liquid volume processed in this series of tests was approximately 5 gallons. The highest quantity of minerals precipitated was obtained by pH neutralizing the brine just before firing, and resulted in 36 grams of precipitate per gallon. This compares with 49 grams of solids obtained by evaporating one gallon of the same brine.

EXAMPLE VI

Latex Separated from Water, as Example of Heavy Hydrocarbon not Recoverable by Centrifuging Latex particles of various sizes up to about 1000 microns were mixed with water, in two separate tests: one wherein only the latex was mixed with the water and another where hydrated lime was also added to the mixture. The latex was in about 1:1 ratio with the water by weight.

In the test involving lime, which was used to aid precipitation, the lime comprised 10% of the weight of the total mixture.

The mixtures were shaken thoroughly, to the point that the latex was evenly suspended in the water. Some of the latex was non-settlable, and could not be centrifuged from the water.

After firing in the electro-hydraulic chamber, the latex was observed as deposited in large particles and as a rubbery deposit in the exit channels of the firing chamber. Some of the large particles were free floating in the water, while some were deposited to the extent that they required scraping off the wall of the firing chamber. The latex was dark, appearing oxidized. It was observed that approximately 50% of the latex was removed from the previous condition of suspension in the water.

In the other tests, the latex and hydrated lime mixture with water was processed in the firing chamber. The mixture was as above, forming a suspension, parts of which would not settle.

After firing, the resulting processed fluid was allowed to settle. The water cleared up to the extent that it was totally clear in the test bottle. Any remaining particles in the water could not be measured.

These tests show the value of the electro-hydraulic process in removal of heavy and complex hydrocarbons from a water mixture. The fired mixtures settled slowly at first; but once settled and then restirred, the settling occurred much faster.

EXAMPLE VII

Boiler and Stack-Wash Water Containing a Variety of Sulfates and Sulfuric Acid Various samples of waste water from the washing of boilers and stacks were first processed chemically (using different agents to precipitate the dissolved metals and minerals and also to allow for rapid settling of the solid particles). Ammonia, caustic soda and hydrated lime were used as agents, for promoting faster settling and as neutralizing agents. After a number of tests, it was determined that best results were obtained when sufficient quantities of these agents were added to bring the mixture to about pH 7.

A total of 20,000 gallons were processed in these tests.

The different efficiencies of the chemical processes were noted as well as settling times to total clarity of the remaining water and the possible particle sizes.

The best results were obtained using a mixture of $CaO$, $Ca(OH)_2$ and $CaCO_3$, as settling agents.

The wash water contained as main contaminants nickel, vanadium and boron as dissolved salts and undissolved compounds in the form of ash.

If the pH of the fluid is brought from the original 3½ to 4 to 7½, the precipitation of a part of the dissolved metals is observed, indicated by a greenish color of the precipitate, while by adjusting the pH to between 8 and 10 a secondary reaction occurs.

This reaction precipitates more minerals (brown precipitate) out and over the time period of a few days changes the original precipitation into a partially undissolved compound, while a part of it is going back into solution.

While a process of mixing the settling agent with the waste water seems to work well to clear the water optically and produces a somewhat mineral free water, it seems to be necessary to control the reactions more closely and also to try to reduce the salt content at the same time.

By electro-hydraulically processing the waste water it was found that the resulting water was pure enough for further possible use in agriculture. The mixture was not so usable without such processing.

When processed this way; by firing the fluid in combination with the settling agent, the result was a mixture of water and solids that settled out very quickly, and a water analysis done on the clear liquid showed not only a lower sodium content but also no detectable traces of boron, nickel an vanadium; i.e. the values were below the detection limit of the analytical instruments used. (Flame-Spectrometer)

This result can be explained by the ionization of the molecules during firing and by the high turbulence generated by the electro-hydraulic shock, that activates all chemical reactions that could occur between the molecules simultaneously.

Therefore, no delayed reactions occur later in time and the result is a stable product.

Also, by injecting just the right amount of reagent the processes can be steered more closely.

The precipitation and settling is aided by the fact that the small particles generated by the chemical process have a tendency to cling together to form larger ones (due to the high turbulence and pressures generated) that settle out easier and produce a clearer liquid.

In order to clear the liquid for further use it can be centrifuged or just let the solids settle by themselves; since the centrifugal process—although 95 to 98% effective as far as the solid matter is concerned, still leaves some solids in suspension and subsequent filtering might therefore be required.

From observation it is concluded that by letting the liquid settle out in a narrow but tall tank just as good a result can be obtained without the need for filtering and centrifuging.

The water resulting from the described process is better than it has to be for irrigation or common industrial uses and might be used as potable water if monitored for quality.

EXAMPLE VIII

Cracking and Catalyzing of Hydrocarbons Without the Presence of Water

A hydrocarbon in the form of light mineral oil (transmission oil) mixed with isopropyl alcohol was fired at an energy level of 120 joules per cubic inch, in a quantity of 50 ml per firing chamber volume. The resulting mixture of hydrocarbons was later distilled to determine the various compounds generated.

A detailed chemical analysis was not performed, but a fractional distillation showed a fairly uniform distribution of liquid compounds separable by different boiling points. Also, after firing and opening of the fill valves to the firing chamber, a certain amount of combustible gases were vented from the process chamber.

Dark particles floating in the processed liquid indicated that some of the light hydrocarbons had been converted to very heavy ones, and possibly to pure carbon.

A layer of tarry substances was deposited around the electrode region.

This test indicated (at least partially) what was theoretically predicted, i.e. that the combination of hydrocarbon compounds produced in the electro-hydraulic process occurs according to a certain statistical distribution.

The above described preferred embodiments illustrate the principles of the invention but are not intended to limit the scope of the invention. Variations to these embodiments will be apparent to those skilled in the art and may be made without departing from the scope of the following claims.

I claim:

1. A method for removing a dissolved organic liquid from a liquid solution with water, comprising,
   introducing a quantity of the liquid solution into a firing chamber,
   discharging an electrical current across electrodes in the firing chamber, in a sudden, high-energy discharge wherein the current arcs across the electrodes, causing a shock wave accompanied by high turbulence to be produced and to move through the liquid solution in the firing chamber, accompanied by high intensity electro-magnetic radiation which travels through the liquid solution,
   thereby causing the dissolved organic liquid to be at least partially ionized and to react with oxygen present to be converted to water and gases, and
   venting the gases from the water.

2. The method of claim 1, wherein the dissolved organic liquid is of such composition that solid precipitates are formed, and including removing the solid precipitates from the water.

3. The method of claim 1, further including introducing the oxidizing agent to the water solution prior to discharging the electrical current.

4. A method for removing a dissolved organic liquid from a liquid solution with water, comprising,
  introducing a quantity of the liquid solution into a firing chamber of substantially confined volume,
  discharging a high energy pulse, in the range of microseconds in length, into the liquid solution, causing a shock wave accompanied by high turbulence to be produced and to move through the liquid solution in the firing chamber, accompanied by high intensity electro-magnetic radiation which travels through the liquid solution,
  thereby causing the dissolved organic liquid to be at least partially ionized and to react with oxygen present to be converted into water and gases, and venting the gases from the water.

5. The method of claim 4, wherein the dissolved organic liquid is of such composition that solid precipitates are formed, and including removing the solid precipitates from the water.

6. A method for recovering precipitatable substances from a water solution, comprising,
  introducing successive quantities of the water solution into a firing chamber, with the solution containing dissolved substances from the group consisting of precious metals, toxic wastes, mineral salts, industrial wastewater and sewage,
  discharging an electrical current across electrodes in the firing chamber, in a sudden, high-energy discharge wherein the current arcs across the electrodes, causing a shock wave accompanied by high turbulence to be produced and to move through the liquid volume in the firing chamber, accompanied by high intensity electro-magnetic radiation which travels through the liquid volume,
  repeating the discharging step at a frequency of at least several times per minute, and moving successive quantities into and out of the firing chamber in an essentially continuous throughput,
  thereby causing the substances to be at least partially ionized, breaking down molecular bonds between the chemical compounds thus forming simpler compounds and some free elements to form different chemical substances, some of which are insoluble and precipitate out as particles from the water solution.

7. The method of claim 6, further including introducing a flocking agent to the water solution prior to the discharging step, so that precipitates of small or molecular particle size are attracted to particles of the flocking agent or polymerized by the flocking agent to form larger particles that can be easily removed from the water.

8. The method of claim 6, wherein the precipitatable substance is a precious metal.

9. The mineral of claim 8, wherein the water solution comprises a geothermal brine.

10. The method of claim 6, wherein the precipitatable substance comprises mineral salts.

11. The method of claim 6, wherein the precipitatable substance is industrial wastewater.

12. The method of claim 6, wherein the precipitatable substance is municipal waste or sewage.

13. The method of claim 6, further including the step of adding chemicals to the water solution prior to discharging, to thereby steer the discharging reaction to precipitate out certain compounds and to control the identity of insoluble precipitates formed.

14. The method of claim 13, wherein the chemicals added include oxygen or an oxidizing agent.

15. The method of claim 13, wherein the chemicals include acid/base neutralizing agents.

16. A method for removing oil from a water and oil mixture, comprising,
  adding sand to the water and oil mixture to form a water, oil and sand mixture,
  introducing a quantity of the water, oil and sand mixture into a firing chamber of substantially confined volume,
  discharging a high energy pulse, in the range of microseconds in length, into the liquid volume, causing a shock wave accompanied by high turbulence to be produced and to move through the liquid volume in the firing chamber, accompanied by high intensity electro-magnetic radiation which travels through the liquid volume,
  thereby causing the oil to be emulsified into fine oil particles and the fine oil particles to be adhered to the sand.

17. The method of claim 16, further including the step of subjecting the oil/water mixture to a coarse filtration prior to introduction to the firing chamber.

18. A method for removing substances from a water solution, comprising,
  introducing a quantity of water solution into a firing chamber of substantially confined volume, the water solution being selected from the group consisting of sea water, fresh water with undesired mineral content, and water contaminated with dissolved toxic substances,
  discharging a fast, intense pulse of energy in the liquid in the firing chamber, in the range of microseconds in length of discharge, so as to cause a shock wave accompanied by high turbulence to be produced and to move through the liquid volume in the firing chamber, accompanied by high intensity electro-magnetic radiation which travels through the liquid volume,
  thereby causing the substances to be at least partially ionized, breaking down molecular bonds between the chemical compounds, thus forming simpler compounds and some free elements to form different chemical substances, some of which are insoluble and precipitate out as particles from the water solution.

19. The method of claim 18, wherein the water solution is moved through the firing chamber via an inlet and an outlet in a substantially continuous flow, with firing occurring at least about once per six seconds.

20. The method of claim 18, wherein the water solution is industrial waste water including dissolved toxic contaminants.

21. The method of claim 20, further including introducing chemical agents to the water solution prior to the discharging step, to thereby steer the discharging reaction to precipitate out certain compounds and to control the identity of insoluble precipitates formed.

22. The method of claim 21, wherein the chemical agents comprise acid/base neutralizing agents.

23. A method for treating liquids containing dissolved or undissolved substances in a process wherein high-intensity electrical energy is discharged into the liquid while contained in a chamber, in order to precipitate solids from the liquid, comprising, providing a rigid, shock-withstanding firing chamber capable of holding a volume of the liquid, with electrodes extending into the chamber for an arc discharge of electrical energy across the electrodes, moving liquid through the firing chamber via an inlet and an outlet of the chamber, in a substantially continuous flow, building up and discharging high-intensity electrical energy across the electrodes in the chamber, at a rate of at last a plurality of times per minute, with the discharge producing intense light energy in the chamber as well as a shock wave through the liquid in the chamber, tending to attack molecular bonding in substances contained within the liquid and to break down bonds to free compounds from solution and some elements from compounds, producing precipitates, and separating the solid precipitates from the liquid downstream of the chamber.

24. A method for treating liquids to induce chemical reactions in the liquid, in a process wherein high-intensity electrical energy is discharged into the liquid while contained in a chamber, comprising, providing a rigid, shock-withstanding firing chamber capable of holding a volume of the liquid, with electrodes extending into the chamber for an arc discharge of electrical energy across the electrodes, moving process liquid through the firing chamber via an inlet and an outlet of the chamber, in a substantially continuous flow, building up and discharging high-intensity electrical energy across the two electrodes in the chamber, using a power supply that is matched to the impedance of the process liquid, at a rate of at least a plurality of times per minute, with the discharge producing intense light energy in the chamber, tending to attach molecular bonding in substances contained within the liquid.

* * * * *